US00RE39052E

(19) United States
(12) Reissued Patent
Charles et al.

(10) Patent Number: US RE39,052 E
(45) Date of Reissued Patent: Mar. 28, 2006

(54) SYSTEM AND METHOD FOR EXPANSION OF A COMPUTER

(75) Inventors: Paul Charles, Scottsdale, AZ (US); Walter C. Peschke, Morgan Hill, CA (US)

(73) Assignee: Tao Logic Systems LLC, Las Vegas, NV (US)

(21) Appl. No.: 10/107,938

(22) PCT Filed: Mar. 7, 1996

(86) PCT No.: PCT/US96/03248

§ 371 (c)(1),
(2), (4) Date: Jan. 24, 1997

(87) PCT Pub. No.: WO96/27836

PCT Pub. Date: Sep. 12, 1996

(Under 37 CFR 1.47)

Related U.S. Patent Documents

Reissue of:
(64) Patent No.: 6,044,215
Issued: Mar. 28, 2000
Appl. No.: 08/737,201
Filed: Jan. 24, 1997

U.S. Applications:
(63) Continuation-in-part of application No. 08/399,728, filed on Mar. 7, 1995, now abandoned.

(51) Int. Cl.
*G06F 13/00* (2006.01)

(52) U.S. Cl. ..... 710/303; 361/683
(58) Field of Classification Search ..... 710/301, 710/302, 303, 304; 361/683
See application file for complete search history.

(56) References Cited

U.S. PATENT DOCUMENTS 4,779,340 A * 10/1988 Kihm et al. ..... 29/847
4,941,845 A 7/1990 Eppley et al.

(Continued)

FOREIGN PATENT DOCUMENTS

EP 0606111 A2 * 7/1994
EP 0624002 A2 * 11/1994

(Continued)

OTHER PUBLICATIONS

Cardstation, DAK Series—PCMCIA Expansion Development Adapter Kit, User Manual—Axonix, Version 1.0, Nov. 1994.*

(Continued)

*Primary Examiner*—Glenn A. Auve
(74) *Attorney, Agent, or Firm*—Jackson Walker LLP; Robert C. Klinger

(57) ABSTRACT

A system and method for interfacing at least one ISA and/or PCI compliant device with a PCMCIA compliant socket on a host computer is disclosed. The system is particularly useful to allow ISA and/or PCI compliant devices, which could not otherwise be used with a portable computer having a PCMCIA socket, to be used with such computers. The system can provide complete compatibility between a PCMCIA socket and ISA/PCI compliant devices even though such industry standards include contradictory requirements. The system allows a user to easily connect and disconnect numerous ISA and/or PCI compliant devices via a single PCMCIA socket commonly found on portable computers. [Preferably included in the system are structures to carry out the functions of: interrupt translation between the PCMCIA port and the ISA devices; direct memory access translation between the PCMCIA port and the ISA devices; translation of a buss address latch enable signal between the PCMCIA port and the ISA devices; translation between a memory read signal and a memory write signal of the PCMCIA port and a system memory read signal and a system memory write signal of the ISA devices; translation between the PCMCIA port and 8 bit ISA devices; DRAM refresh of the ISA devices; providing a clock signal to the ISA devices; supplying power to the ISA devices; and, translation of the timing between the PCMCIA port and the ISA devices.]

41 Claims, 17 Drawing Sheets

U.S. PATENT DOCUMENTS

| | | | | | |
|---|---|---|---|---|---|
| 4,969,830 | A | | 11/1990 | Daly et al. | |
| 5,187,645 | A | | 2/1993 | Spalding et al. | |
| 5,191,653 | A | * | 3/1993 | Banks et al. | 710/113 |
| 5,373,149 | A | | 12/1994 | Rasmussen | |
| 5,430,847 | A | * | 7/1995 | Bradley et al. | 710/130 |
| 5,432,916 | A | | 7/1995 | Hahn et al. | |
| 5,452,180 | A | | 9/1995 | Register et al. | |
| 5,463,742 | A | * | 10/1995 | Kobayashi | 710/101 |
| 5,471,587 | A | * | 11/1995 | Fernando | 710/129 |
| 5,477,415 | A | | 12/1995 | Mitcham et al. | |
| 5,481,678 | A | * | 1/1996 | Kondo et al. | 710/101 |
| 5,499,346 | A | * | 3/1996 | Amini et al. | 710/128 |
| 5,519,851 | A | * | 5/1996 | Bender et al. | 710/102 |
| 5,579,491 | A | | 11/1996 | Jeffries et al. | |
| 5,596,169 | A | * | 1/1997 | Baker et al. | 174/33 |
| 5,596,562 | A | * | 1/1997 | Chen | 369/124 |
| 5,632,020 | A | | 5/1997 | Gephardt et al. | |
| 5,634,080 | A | | 5/1997 | Kikinis et al. | |
| 5,724,529 | A | | 3/1998 | Smith et al. | |
| 5,941,965 | A | | 8/1999 | Moroz et al. | |
| 6,256,691 | B1 | * | 7/2001 | Moroz et al. | 710/303 |

FOREIGN PATENT DOCUMENTS

| | | | |
|---|---|---|---|
| JP | 02-140852 | | 5/1990 |
| JP | 3001429 | | 2/1994 |
| JP | 06-028307 | | 2/1994 |
| WO | WO 95/23368 | * | 8/1995 |
| WO | WO 9608773 A2 | * | 3/1996 |

OTHER PUBLICATIONS

Design of the ISDN PC Card—K. Kitamura, K. Higuchi, S. Nakano, T. Ueda—ICCS '94, Singapore.*

Cirrus Logic Intros Enhanced PCMCIA Host Adapter—Newsbytes, Ian Stokell, Nov. 10, 1993.*

Board Vendors Respond with PCMCIA Cards, Expansion Modules—Electronic Engineering Times, Oct. 10, 1994.*

PCMCIA: Adaptec Targets Mobile Computing Market with Two New Host Adapters that Relieve Problem of System to System and Peripheral Connectivity—Edge: Work Group Computing Report, Nov. 21, 1994.*

Cardstation—Expanding Your Portable World, Axonix Advertisement, 2 pages.*

The Universal Portable Multimedia Solution—Axonix Advertisement, 1 page.*

Cardstation Promedia™, Applications, Presentations, Training, Sales, Games & Education—Axonix Advertisement, 1 page.*

Portable CD–ROM Players—Laptop Buyer's Guide and Handbook, vol. 13, No. 1, pp. 55 and 56.*

CD–Station: Low Cost, High Performance Multimedia Solution for PCMCIA—PACRIM Advertisement, 1 page.*

Design of the ISDN PC Card—K. Kitamura, K. Higuchi, S. Nakano, T. Ueda, NTT R & D, vol. 43, ISS 11, p. 1319–28, 1994, (Japanese Text—English Abstract).*

Cardstation Promedia.TM., Applications, Presentations, Training, Sales, Games & Education—Axonix Advertisement, 1 page.*

Brochure entitled "Card Station Expanding Your Portable World" Axonix Corporation 1994.

Anderson, et al. "CardBus System Architecture" pp. 150–153, 194–201, 228–231, 322–325, 1995.

Anderson, Don "PCMCIA System Architecture" 16–Bit PC Cards, $2^{nd}$ Edition, pp. 146–167, 214–215, 218–225, 296–297, 1995.

Kitamura, et al "Design of the ISDN PC Card" NTT Human Interface Laboratory, Japan pp. 1169–1174, 1994.

Adaptec, "Hardware Installation Guide" CardPark APA–4510, ISA–to–PCMCIA Card Adapter for Desktop PC's, pp. 1–7.

Adaptec, "SlimSCSI 1460" For Fast, Easy Connections to All SCSI Devices 6 pages.

Edge: Work–Group Computing Report, Nov. 21, 1994 "PCMCIA: Adaptec targets mobile computing market with two new host adapters that relieve problem of system–to-system and peripheral connectivity" 2 pages.

* cited by examiner

SYSTEM AND METHOD FOR EXPANSION OF A COMPUTER

Matter enclosed in heavy brackets [ ] appears in the original patent but forms no part of this reissue specification; matter printed in italics indicates the additions made by reissue.

RELATED APPLICATIONS

This application is a continuation-in-part of U.S. patent application Ser. No. 08/399,728 filed on Mar. 7, 1995 (now abandoned) entitled System and Method for Expansion of a Computer.

BACKGROUND

1. The Field of the Invention

This invention relates to digital computers. More specifically, the present invention relates to devices used to expand the ability of an existing computer to utilize additional hardware and provide additional features for the user of the computer.

2. The Prior Art

The widespread use of computers in industrial societies has brought the benefits of computers to large numbers of people. In particular, the standardization and availability of personal computers has provided that each user can customize such computers with a wide variety of hardware and software. Unfortunately, some users who want to add hardware to their computer find that all available expansion slots or ports which can accommodate such hardware have already been utilized in their computer. Thus, the user must forego adding one or more hardware items.

The problem of adding hardware is particularly troublesome to users of portable computers. Such portable computers commonly are generally classified into laptop, note book, sub-note book, and palm top size classes. The small size of these computers requires that all of the components associated therewith be miniaturized. In order to allow the user to add hardware to such portable computers, an industry standard promulgated by the Personal Computer Memory Card International Association (PCMCIA) has gained wide acceptance. Such hardware is commonly referred to as a PC Card or a CardBus Card and is known as "PC Card compliant," "PCMCIA compliant" or "CardBus compliant" PC cards and CardBus Cards are compacq hardware devices having dimensions of about 2.1 inches by about 3.4 inches with a thickness of only 3.5 mm, 5 mm, 8 mm or some other dimensions allowed by the promulgated standard. The PC Card typically slides into a socket provided on the side of the portable computer to allow easy replacement of one PC Card with another PC Card. Increasingly, users of desktop computers, as well as other electronic devices, are also using such cards to add hardware devices to their computers.

Widely used hardware devices such as modems, random access memory, and disk drives, for example, are all available as PC cards and will soon be available as CardBus Cards. There are, however, numerous hardware devices which are not yet available, or which may never be available, in a PC Card implementation or a CardBus Card implementation. Thus, portable computer users are unable to use the myriad of hardware devices which are available to desktop computer users. Also, many portable computers do not provide additional ports for communication with hardware devices such as keyboards and pointing devices. For the foregoing reasons, portable computer users are unable to utilize many hardware devices which are utilized by other computer users.

In order to provide computer users with additional expansion capability and convenience of use for their computers, devices referred to as "port replicators" and "expansion chassis" have been provided. These devices provide additional locations for other hardware devices to interface with a computer. These other hardware devices may be stand alone, or external, devices which are commonly configured to communicate with the computer via a serial port using the widely known RS-232 communication protocol. Alternatively, these other hardware devices may be internal devices which are merely printed circuit cards adapted to be installed inside the computer case and which comply with the Industry Standard Architecture (ISA) standard or the Peripheral Component Interconnect (PCI) standard. Port replicators and expansion chassis can also be used to provide added convenience for a portable computer user by making connections to an external key board, external video monitor, and the like, simpler than if each external device needed to be connected to and disconnected from the portable computer.

The previously available port replicators and expansion chassis provide a few useful functions. Disadvantageously, such devices cannot interface with a PCMCIA socket provided in portable computers. Moreover, in many previously available port replicator devices and expansion chassis, only particular types of expansion devices and/or expansion devices which comply with only a less popular standard can be used. Alternatively, some previously available port replicators and expansion chassis utilize non-standard or proprietary connectors and protocols which seriously limits their usefulness.

In view of the foregoing, it would be a significant advance in the art to provide an improved system and method for expanding a computer which overcomes the drawbacks and disadvantages found in the previously available devices.

BRIEF SUMMARY AND OBJECTS OF THE INVENTION

In view of the above described state of the art, the present invention seeks to realize the following objects and advantages.

It is a primary object of the present invention to conveniently expand a computer using widely available peripheral devices even though such devices are not intended to be used with the computer.

It is also an object of the present invention to expand the capabilities of a portable computer, and particularly a lap top or smaller computer, using devices intended to be installed in a desk top computer.

It is a further object of the present invention to conveniently interface ISA compliant expansion add-on printed circuit cards with a PCMCIA compliant socket.

It is a still further object of the present invention to conveniently interface PCI compliant expansion add-on printed circuit cards with a PCMCIA compliant socket.

It is yet another object of the present invention to conveniently interface both ISA compliant expansion add-on printed circuit cards and PCI compliant expansion add-on printed circuit cards with a PCMCIA compliant socket using a single device.

It is another object of the present invention to conveniently interface ISA or PCI compliant devices with a PCMCIA compliant socket without requiring modification of the software used with the ISA or PCI compliant devices.

It is also an object of the present invention to expand the number of ISA ports and/or PCI ports found on a lap top or smaller computer via the PCMCIA socket present on the computer.

It is yet another object of the present invention to interface a device which requires any one of a number of different interrupt requests with a computing device which provides only one interrupt request.

It is a further object of the present invention to interface a device which requires direct memory access with a computing device which does not provide direct memory access.

It is still another object of the present invention to accurately translate the timing of ISA compliant signals and/or PCI compliant signals to PCMCIA compliant signals and to accurately translate PCMCIA compliant signals to ISA compliant signals and/or PCI compliant signals in a manner which is transparent to the devices involved and to the user of the computer.

It is also an object of the present invention to interface 8 bit memory peripheral devices with a computing device which only accommodates 16 bit memory device signals.

It is yet another object of the present invention to supply the voltage and current requirements of an ISA compliant add-on expansion printed circuit card and/or a PCI compliant add-on expansion printed circuit card which cannot be supplied by the host computer.

These and other objects and advantages of the invention will become more fully apparent from the description and claims which follow, or may be learned by the practice of the invention.

The present invention provides a system and method for interfacing at least one ISA compliant device or at least one PCI compliant device with a PCMCIA compliant socket on a host computer. The present invention is particularly useful to allow ISA compliant devices or at least one PCI compliant device, which could not otherwise be used with a portable computer, to be used with such computers.

The present invention advantageously can provide complete compatibility between a PCMCIA socket and ISA compliant devices and/or PCI compliant devices, even though the PCMCIA industry standard is very different and includes contradictory requirements than the ISA and the PCI standards. Thus, with the present invention, any number of different ISA compliant devices and/or PCI compliant devices can be interfaced with the PCMCIA socket of a host computer. This allows a user to easily connect and disconnect numerous ISA compliant devices and/or PCI compliant devices via a single PCMCIA socket commonly found on portable computers and also on desk top computers. The embodiments of the present invention preferably provide all of the functions necessary to interface a PCMCIA compliant socket with nearly all available ISA and/or PCI compliant devices.

BRIEF DESCRIPTION OF THE DRAWINGS

In order to better appreciate how the above-recited and other advantages and objects of the invention are obtained, a more particular description of the invention briefly described above will be rendered by reference to a specific embodiment thereof which is illustrated in the appended drawings. Understanding that these drawings depict only a typical embodiment of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Figure 1A:
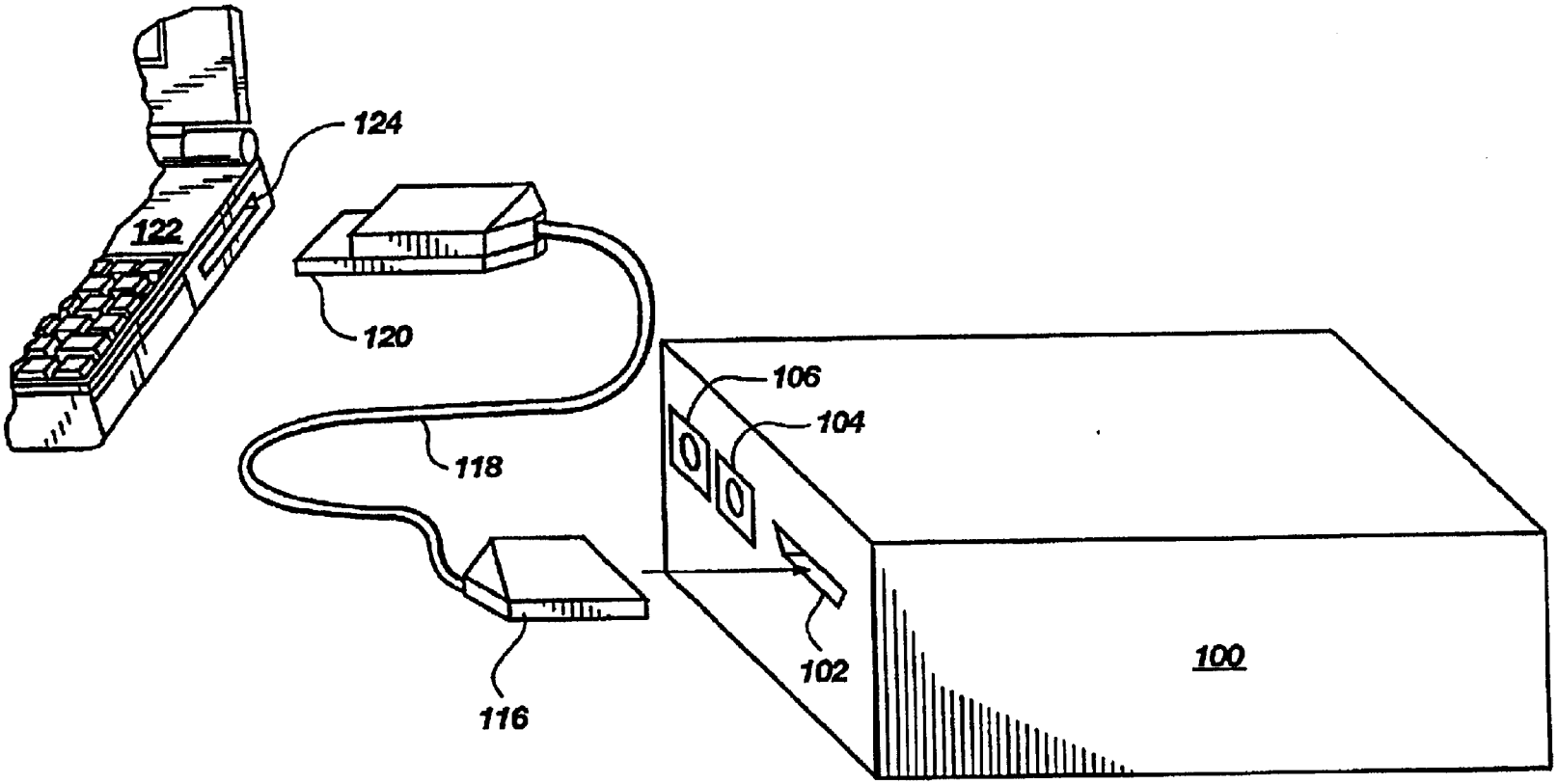
FIGS. 1A and 1B are perspective external views of a first presently preferred embodiment of the present invention.
Figure 1B:
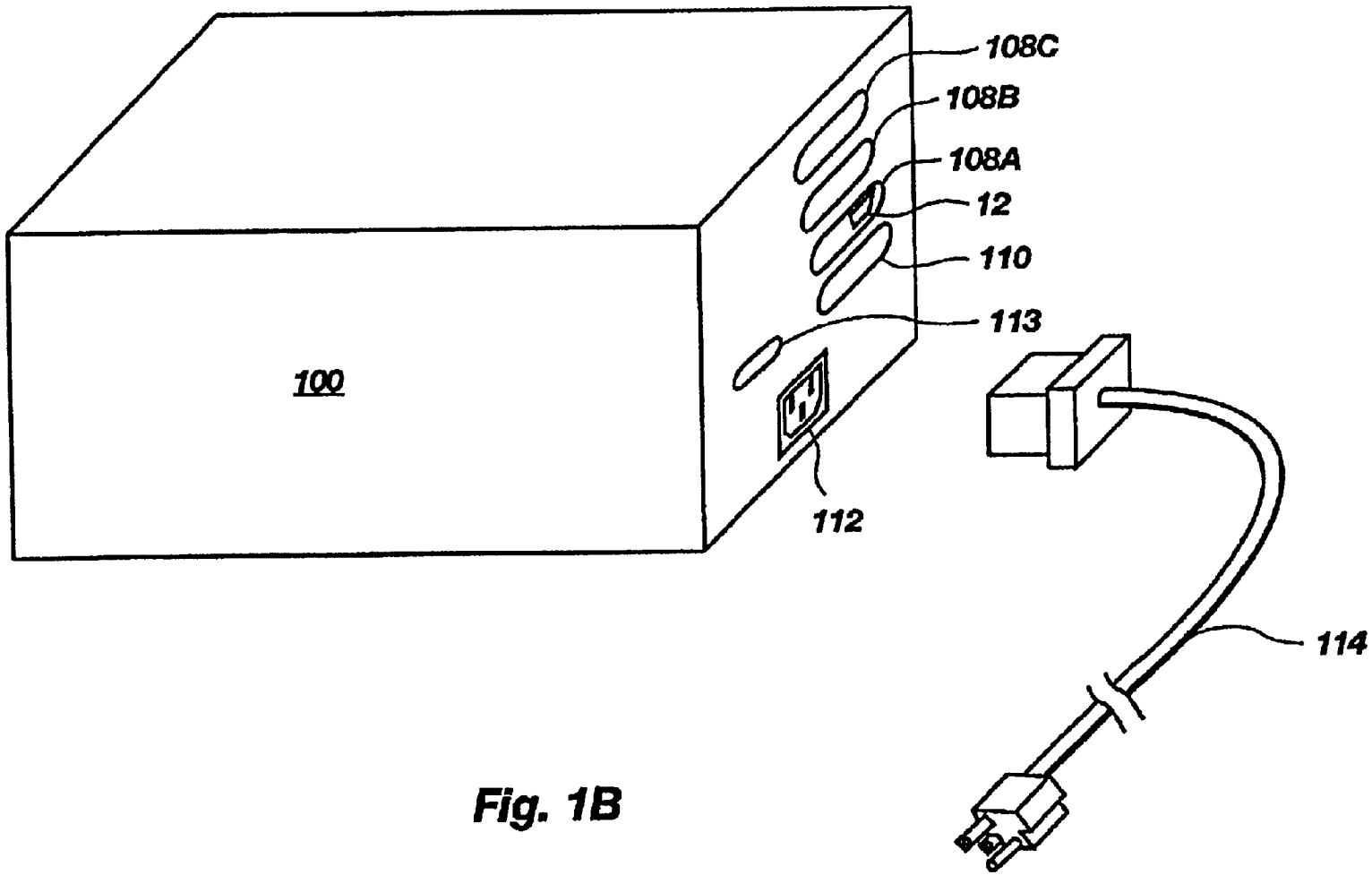

Reference will now be made to the drawings wherein like structures will be provided with like reference designations. FIGS. 1A and 1B are perspective external views (not necessarily to scale) of a first presently preferred embodiment of the present invention. The embodiment illustrated herein will be used as one example of the inventive concepts of the present invention with the understanding that many other particular renderings of the present invention are also possible and can be arrived at by those skilled in the art using the teachings presented herein.

Represented in FIGS. 1A–B is a host computer 122 having a PCMCIA compliant socket 124. The Personal Computer Memory Card International Association (PCMCIA) promulgates the PCMCIA standard which has gained wide acceptance in the industry. It is preferred that the PCMCIA compliant socket adhere to PCMCIA release 2.1 specification, Type II extended card standard. This preferred standard specifies the physical, electrical and environmental parameters which compliant devices must meet. The system and method of the present invention described herein are compatible with the PCMCIA Card Services Specification 2.1 and Card Services Specification 2.1 as well. This standard and the accompanying specifications are well-known in the art and PCMCIA release 2.1, PCMCIA Card Services Specification 2.1, and Card Services Specification 2.1, PCMCIA Standard Release 2.1, and all releases promulgated thereafter (including the PC Card standard (1995)), are now all incorporated by reference herein in their entireties. It is to be understood that the present invention can be utilized with other PCMCIA specifications and standards which are now available or which become available in the future as well as with other similarly instructive standards which are now available in the industry or which become available in the future. Examples of such other specifications and standards include the CardBus PC Card standard which is also now incorporated herein by reference in its entirety. Further information regarding the implementation of these standards can be obtained from the publication Anderson, D. & Shanley, T., CardBus SYSTEM ARCHITECTURE (1996) (published by Addison-Wesley Publishing Company) which is also now incorporated herein in its entirety.

In its most advantageous use, the embodiment of the present invention described herein allows ISA and/or PCI compliant devices to interface with the PCMCIA socket of a portable computer and allow the portable computer to access all of the functions of the ISA or PCI compliant device. As is known in the art, ISA and PCI compliant devices are widely available in the industry. Many ISA and PCI compliant devices are configured as "add-on cards" which are printed circuit boards provided with an edge connector which is received into an open slot coupled to the back plane of a desktop computer. The "add-on cards" are often as large as the portable host computer 122 with which the apparatus of the present invention is used. While the described embodiment of the present invention is explained herein for use with a portable computer, the present invention can also advantageously be used with other computing devices.

The present invention provides that the wide variety of devices available as add-on cards at a reasonable cost can be conveniently used with all portable computers having a PCMCIA socket. Moreover, as will be explained more fully later in this disclosure, the embodiments of the present invention also allow a portable computer user to connect and disconnect a full size keyboard, a pointing device (such as a mouse), a video add-on card, a video monitor, and other ISA compatible devices (which would generally be used only with a desktop computer) by merely inserting and removing a single plug into the PCMCIA socket in the portable computer. Moreover, the present invention is much more flexible, and less costly, than providing a proprietary docking station for a portable computer which only provides, for example, an independent key board and another device which is not ISA compliant or PCI compliant.

It is understood in the industry that the ISA standard for PC compatible computers has not been promulgated by a single entity but has evolved through the years based upon the original architecture of the IBM PC Personal Computer. Nevertheless, the ISA standard is well-known in the industry. Information regarding the ISA standard is contained in the publications: Solari, Edward, ISA & EISA THEORY AND OPERATION (Annabooks publication); Shanley, Tom & Anderson, Dan, ISA SYSTEM ARCHITECTURE and Messmer, Hans-Peter, THE INDISPENSABLE PC HARDWARE BOOK all of which are now incorporated herein by reference. The PCI standard was developed by Intel Corporation and is managed by a consortium of industry partners known as the PCI Special Interest Group. Revision 2.1 of the specification for the CardBus standard is available for PCI Special Interest Group and Revision 2.1 of the specification is now incorporated herein in its entirety. Further information regarding the PCI standard can be obtained from the publication Anderson, D. & Shanley, T., PCI SYSTEM ARCHITECTURE (1995) (published by Addison-Wesley Publishing Company) which is also now incorporated herein in it entirety.

The embodiment of the present invention described herein provides includes a translation driver which is loaded onto the portable computer 122, preferably as software, which allows the portable computer to interface with ISA and/or PCI compliant devices in a transparent manner, that is, without modification of the other functions of the portable computer and without the user taking any notice during operation. Advantageously, any ISA and/or PCI device drivers which accompany the ISA and/or PCI compliant device are also loaded onto the portable computer 122 and operate in the expected fashion.

The present invention is compliant with ISA and PCI standards and the customary ready read and write cycles with memory and I/O resources. The embodiment of the present invention disclosed herein is also compliant with ISA standard and ready DMA transfer cycles and seven DMA levels being supported. Also supported are eleven interrupts. The embodiment of the present invention described herein is compliant with the physical, electrical, and environmental parameters of the ISA standard and those skilled in the art can readily use the information herein to conform the described embodiment to be compliant with the physical and electrical parameters of the PCI standard. Thus, any ISA or PCI compliant device (with the exception of add-on bus owner cards in the case of PCMCIA Rev. 2.1 and PC Card 95 revision sockets), are supported by the described embodiment.

The translation driver loaded onto the portable computer 122 provides a transparent interface between the ISA and/or PCI device driver loaded onto the portable computer and the ISA or PCI compliant device. The ISA and/or PCI device drivers are loaded onto and used on the portable computer 122 in the same manner as if the ISA or PCI device drivers and the ISA or PCI compliant devices were installed in an AT class PC compatible computer.

Still referring to FIGS. 1A–B, the apparatus of the presently preferred embodiment includes a chassis in which ISA and/or PCI add-on cards can be installed and ISA and/or PCI ports to which devices can be connected. The chassis is provided with a housing 100. A cable 118 is provided which preferably is compliant with the PCMCIA specifications. For CardBus compatibility the cable 118 provides an electrical circuit attached to its "CARD GND" line which provides buffer storage and resyncronization of high speed signals after traveling to and from the cable 118. The circuit also provides intelligent communication with the host computer 122 so as to allow for the latency requirements of the cable 118 and ISA and/or PCI add on cards. A first connector 120 is configured to be received into the PCMCIA socket 124 in the portable computer 122. A second connector 116 is received into a PCMCIA port 102 provided in the housing 100 and makes electrical connection with the components contained therein. The cable 118 is preferably 68 pin molded shielded cable as can be obtained in the industry or readily fabricated by one skilled in the art using the information contained herein but cables with fewer pins and conductors can also be advantageously used.

Provided on the exterior of the housing 100 are access to a keyboard port 106, a mouse port 104, a serial port 113, and a parallel port 110 all of which comply with the AT/ISA industry standard. The keyboard port 106 utilizes an industry standard PS/2 connector and is carried out using an 8042 implementation. The mouse port 104 also utilizes an industry standard PS/2 connector and is carried out using an 8042 invention's interfacing ISA and/or PCI compliant devices with PCMCIA standards. The logic board assembly 132 supports the keyboard port 106, the mouse port 104, the serial port 113, the parallel port 110, and the PCMCIA port 102. The AC receptacle 112 is connected to the logic board assembly 126 via conductors 130. A grounding lug 131 is preferably attached to chassis ground. A DC power supply board 126, as known in the art is provided to power the components of the described embodiment of the invention and to supply the voltage and current requirements of ISA and/or PCI compliant devices which are greater than can be ensured by PCMCIA compliant devices. The power supply board 126 is preferably connected to the logic board assembly via a five conductor cable 128.

The logic board assembly 132 is provided with an edge connector 134 which is inserted into one of four back plane connectors 138A–D provided on a back plane assembly 136. The back plane assembly receives ISA and/or PCI compliant devices, such as the ISA compliant video card 10, just as would be the case in a PC compatible desktop computer. It will be appreciated that the present invention encompasses arrangements where only one ISA or PCI compliant device is accommodated and situations where numerous ISA and/or PCI compliant devices are accommodated. Thus, a larger or smaller number of back plane connectors 138A–D can be provided as well as omission of, or more devices added to, the keyboard, mouse, serial, and parallel ports. The video add-on card 10 is preferably any one of a number of video cards available in the industry and is merely exemplary of the ISA and PCI compliant devices which can be added to the back plane assembly 134.

It will be appreciated that the embodiments of the present invention provide a system and method for making physical and electrical connection with a host computer 122 PCMCIA socket, normally an IBM compatible portable computer, and interface the signals present thereat with ISA and/or PCI compliant signals in function, timing, electrical, and physical respects so that, for example, a third party ISA and/or PCI video add-on card can be used by the host computer 122.

The PCMCIA standard and the ISA standard have either been promulgated or evolved with completely different environments and purposes in mind. In fact, the PCMCIA standards have been developed specifically with miniaturization and use in down sized portable computers in mind. In contrast, the ISA standards evolved prior to the widespread use of portable computers and were not, and are not, concerned with miniaturization or portability. The advantages which accrue with the use of devices which are PCMCIA compliant are great enough that schemes have been introduced which allow PCMCIA compliant devices to be used with ISA standard busses and its progeny. Such devices which allow a PCMCIA compliant device to be used with an ISA bus need only provide readily implemented interfacing since the PCMCIA compliant devices, prior to the introduction of the CardBus standard, do not require any signals other than substantially those which are already present on the ISA buss. In contrast, the present invention allows ISA compliant devices, which require signals which are not supplied or contemplated by the PCMCIA standard, to interface with a computer via a PCMCIA socket. Thus, the present invention must provide signals which are required by an ISA device which do not have any counterpart in the PCMCIA standard. The provisions of such signals, with the necessary timing requirements, is a great advance in the art and provides advantages not previously available in the industry.

As indicated previously, the evolving nature of the ISA standard allows ISA compliant devices, mostly ISA add-on printed circuit cards, to take advantage of only some of the features or signals which are present on an ISA standard buss. In accordance with the present invention, it is most preferred that the embodiment of the present invention provide complete compatibility with ISA and/or PCI compliant devices. It should be understood that devices which proclaim ISA or PCI compliance may not comply with the ISA or PCI standard requirements to which the embodiment of the present invention complies. Thus, embodiments of the present invention preferably provide "complete" compatibility with the ISA and PCI standards set forth in the earlier cited publications but it is to be understood that compliance with the appropriate standard does not exclude the possibility that a device which proclaims itself to be ISA or PCI compliant may not be compatible with an embodiment of the present invention.

Importantly, using the information presented herein, the embodiments of the present invention preferably provide complete compatibility with ISA and/or PCI compliant devices so it will be a rare instance where an ISA or PCI compliant device will not function properly with the embodiment of the present invention described herein. In many cases, it may not be necessary or desirable to provide compatibility with all ISA and PCI compliant devices. Thus, embodiments of the present invention may advantageously provide only selected signals and thus less than complete compatibility will all ISA and PCI compliant devices. In some instances, only particular ISA or PCI compliant devices or a class of ISA or PCI compliant devices may need to be interfaced with a host computer 122 having a PCMCIA socket and thus not all of the features described herein need be included in every embodiment of the present invention.

Figure 3:
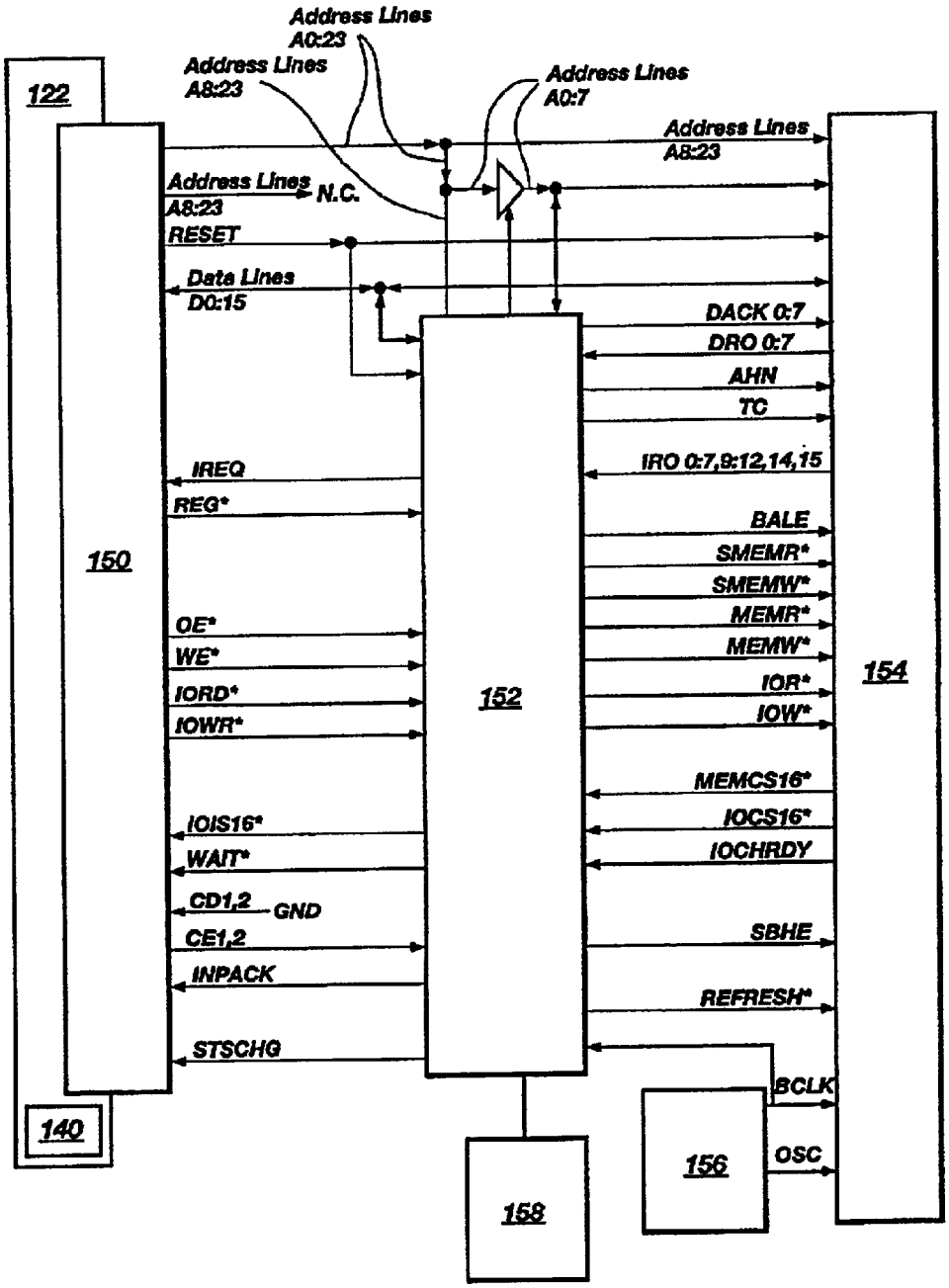
FIG. 3 is a block diagram showing the principal functional components included in one representative preferred embodiment of the invention.
Figure 3A:
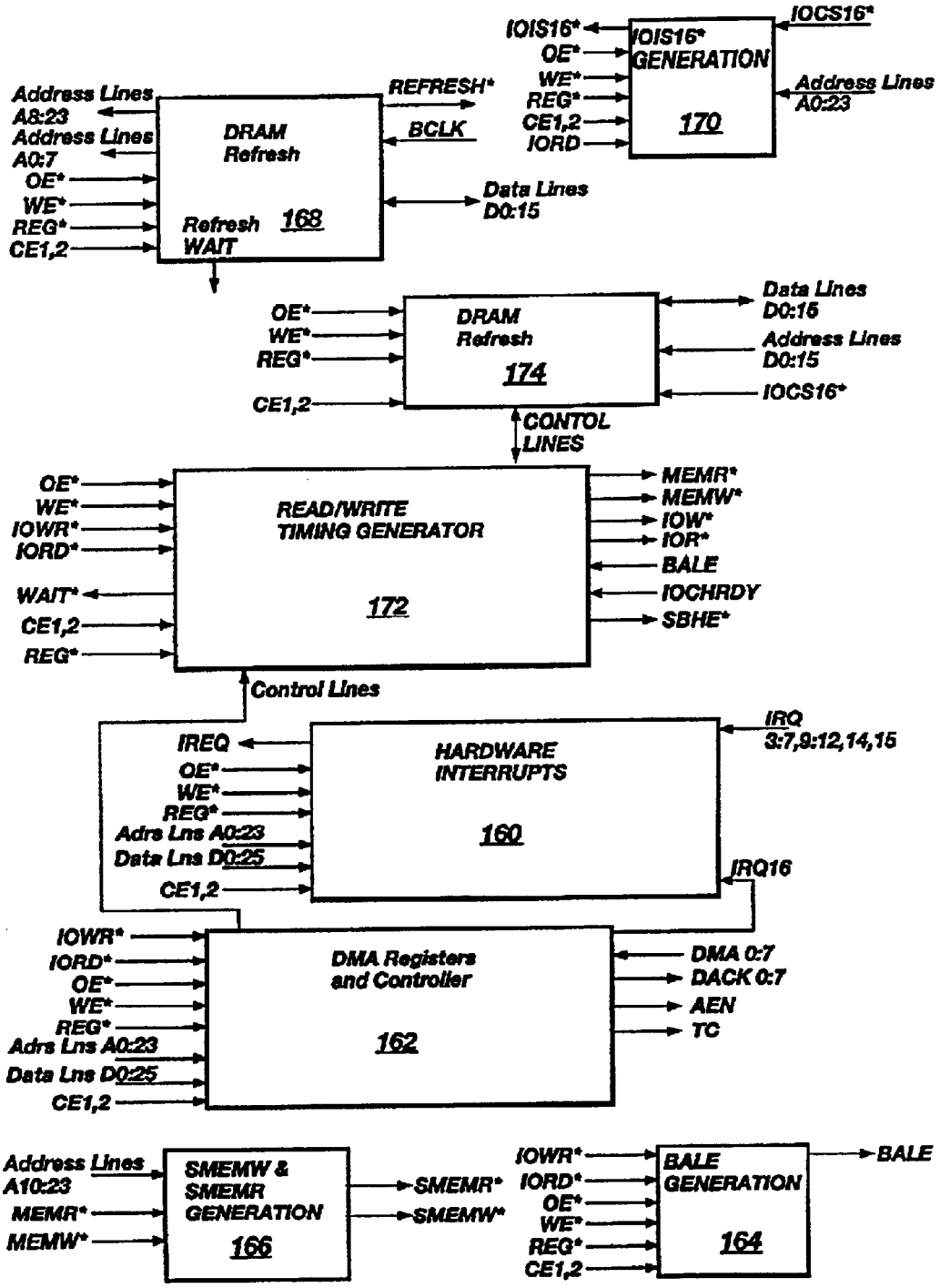
FIG.3A is a block diagram showing the principal functional tasks carried out by the translator circuit represented in FIG. 3.
Figure 4A:
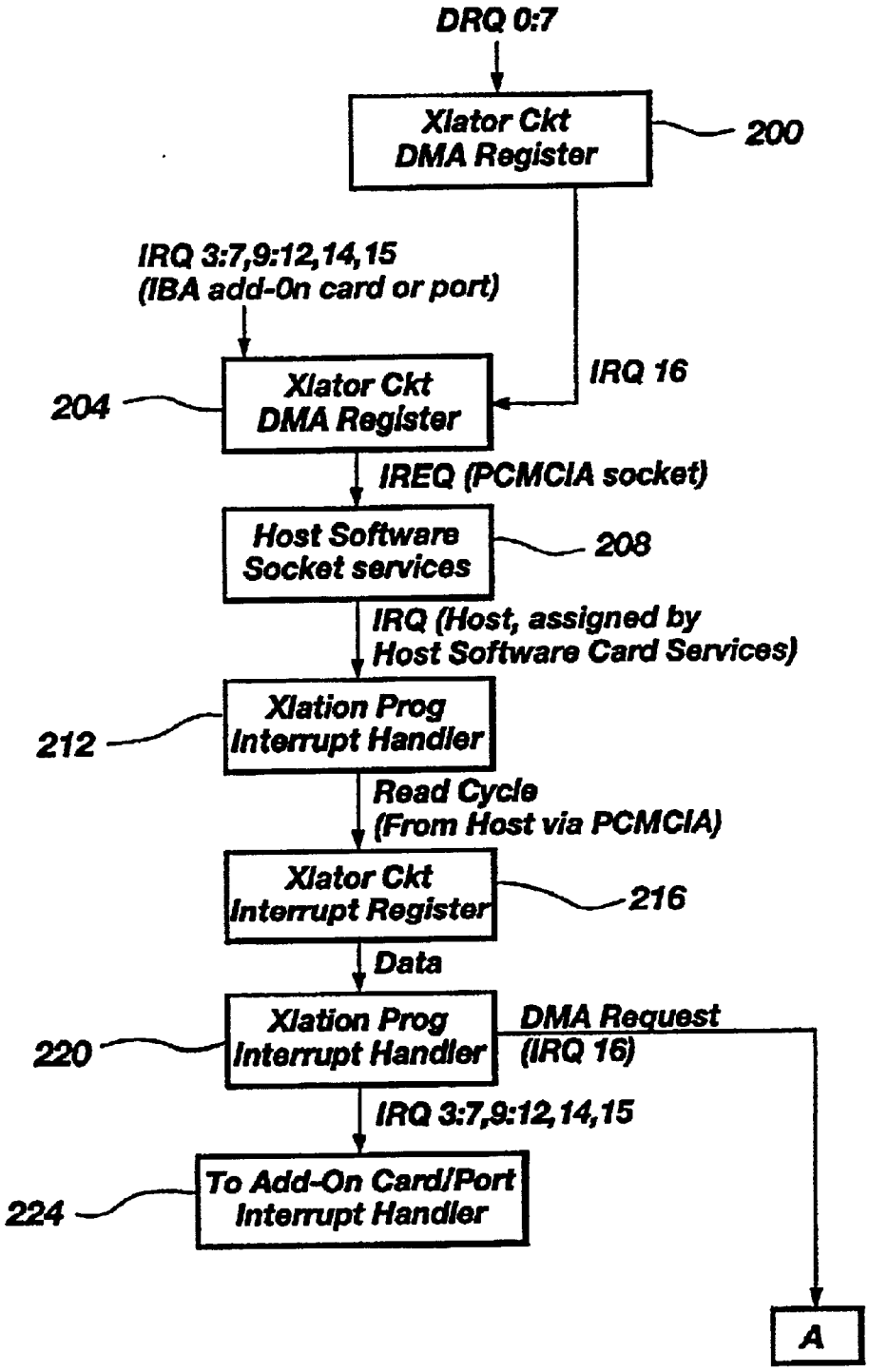
FIGS. 4A–B are flow charts showing the pertinent steps carried out by the embodiment of the invention.
Figure 4B:
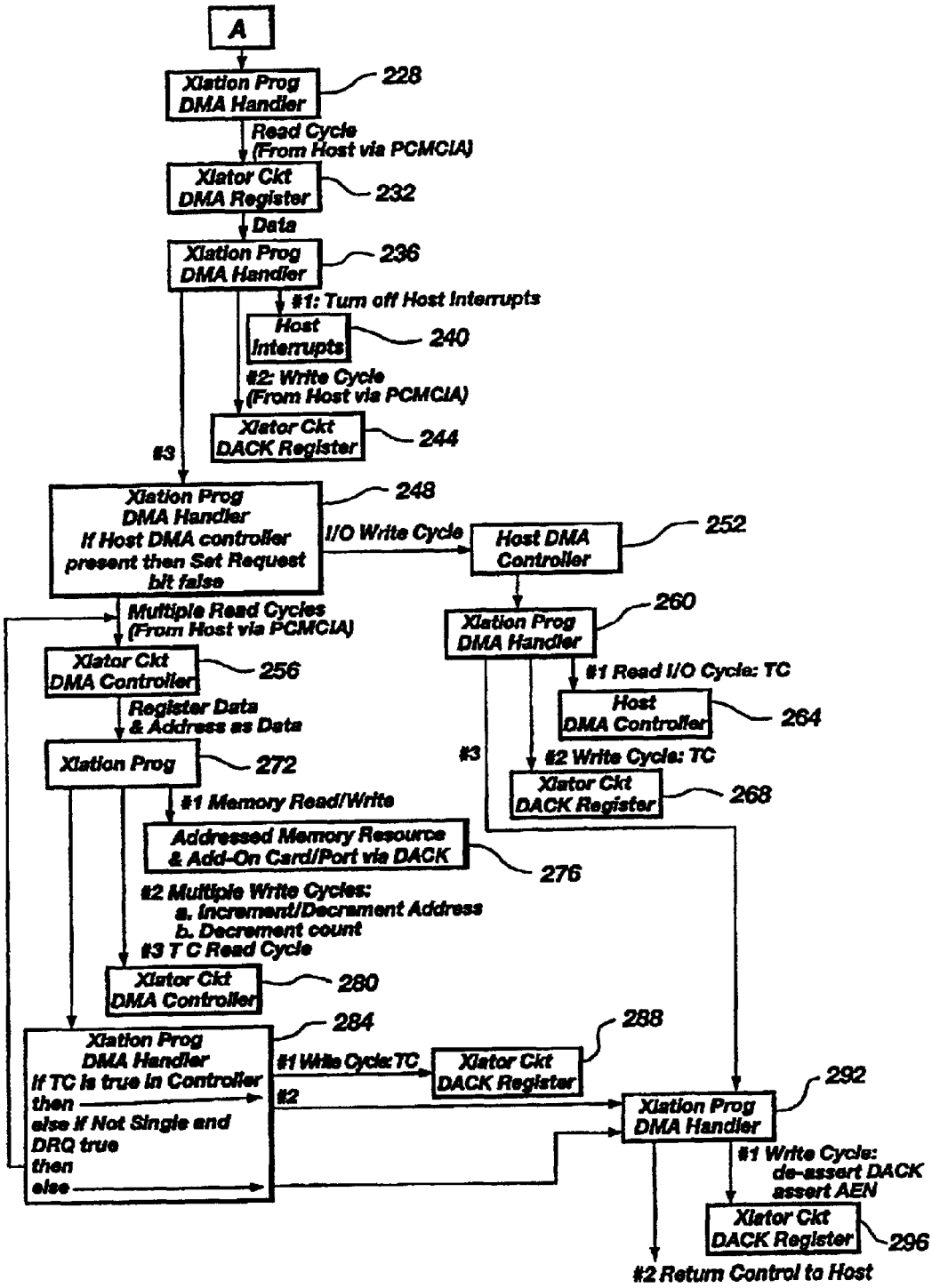

Reference will next be made to FIG. 3 which is a block diagram showing the electrical functions carried out by the embodiments described herein. Reference will also be made to FIG. 3A which is a block diagram showing the principal functional tasks carried out by the translator circuit 152 represented in FIG. 3. It will be appreciated that the primary function of the present invention can be described as translation between PCMCIA signals to ISA and/or PCI signals. Thus, the components of the present invention may be referred to by the translation function which they carry out as hereinafter explained. FIGS. 4A–B, which are flow charts illustrating the pertinent steps carried out by the components of the described embodiment of the present invention, will also be referred to in order to best explain the preferred operation. In FIGS. 4A–B, the abbreviation "Xlator Ckt" refers to the translator circuit 152 and the abbreviation "Xlation Prog" refers to the translator program 140. For clarity of explanation, reference will be made simultaneously to FIGS. 3, 3A, and FIGS. 4A–B.

Illustrated in FIG. 3 is the PCMCIA 150 socket provided on the host computer 122 with the PCMCIA socket signals associated therewith. The preferred embodiment described herein includes a translation program 140 which resides in the host computer 122 and which is preferably loaded at boot time. The specific programming code to carry out the translation driver can be readily arrived out by one skilled in the art using the information set forth herein. The translation program 140, configured as what is commonly referred to in the industry as a driver, can be embodied in software, firmware, or hardware. Also illustrated in FIG. 3 is a power supply 158 and a clock 156 as will be explained further shortly.

Also illustrated in FIG. 3 is a translation circuit 152. The translation circuit 152 in its preferred implementation is an integrated circuit which carries out the functions herein described. The translation circuit 152 can most preferably be implemented as a gate array but other implementations of the herein described functions are also to be considered within the scope of the present invention.

Definitions of many of the pertinent signal names indicated in FIGS. 3, 4A–B, and 5A–L can be obtained from the publications cited earlier.

The PCMCIA signals presented at the PCMCIA socket 150 of the host computer 122 and the ISA connectors, represented at 154, are buffered from each other by the translation circuit 154 and the translation program 140 residing in the host computer 122 and containing the PCMCIA socket 150. The structures of the present invention provide a bridge between the incompatible needs of the PCMCIA socket signals and the ISA signals.

Importantly, the PCMCIA standards provide for only one hardware interrupt (IREQ) while the ISA (AT) complaint buss must provide multiple hardware interrupts (IRQ 3 through 7 and 9 through 12, 14 & 15). Thus, in order to provide compatibility with ISA devices, the present invention must preferably provide structures to translate between the single hardware interrupt provided by the PCMCIA socket and the multiple interrupts provided by the ISA bus 154 (see FIG. 3A at block 160). The eleven IRQ (interrupt request) signals from the ISA (AT standard) base or I/O port(s), such as the serial port and key board port (106 & 113 in FIGS. 1A–B), enter the translation circuit 152. Upon activation of one or more of the eleven IRQ (interrupt request) signals by the port(s) or ISA compliant add-on card(s), the interrupt request(s) are stored in an interrupt register provided within the translation circuit 152 (see step 200). Each interrupt has a unique bit location within the interrupt register (see step 204). It will be appreciated that the PCI standard does not require interrupt signals and that the embodiments of the present invention can provide complete compliance with PCI devices without generating such interrupt signals.

Having received one or more interrupt requests, the translation circuit then activates the IREQ (interrupt request) signal to the PCMCIA socket 150 (see step 208). During boot time this IREQ signal has been assigned a unique interrupt number that calls the translation program 140 in accordance with the present invention. The assignment of a unique interrupt number is negotiated between the translation program 140 and PCMCIA Card Services software, as known in the industry, in the usual manner. Having been called, the translation program then reads the contents of the interrupt register within the translation circuit 152 and thus identifies the unique interrupt number (by bit location) of the requesting I/O port(s) or ISA compliant add-on card(s). The translation program 140 communicates with the translation circuit 152 via the PCMCIA socket 150 (see steps 212, 216 & 220). Thus, from the perspective of the translation program, the register may be located within a predefined location of attribute memory space, I/O space or memory space (as allowed by the PCMCIA standard).

Figure 2:
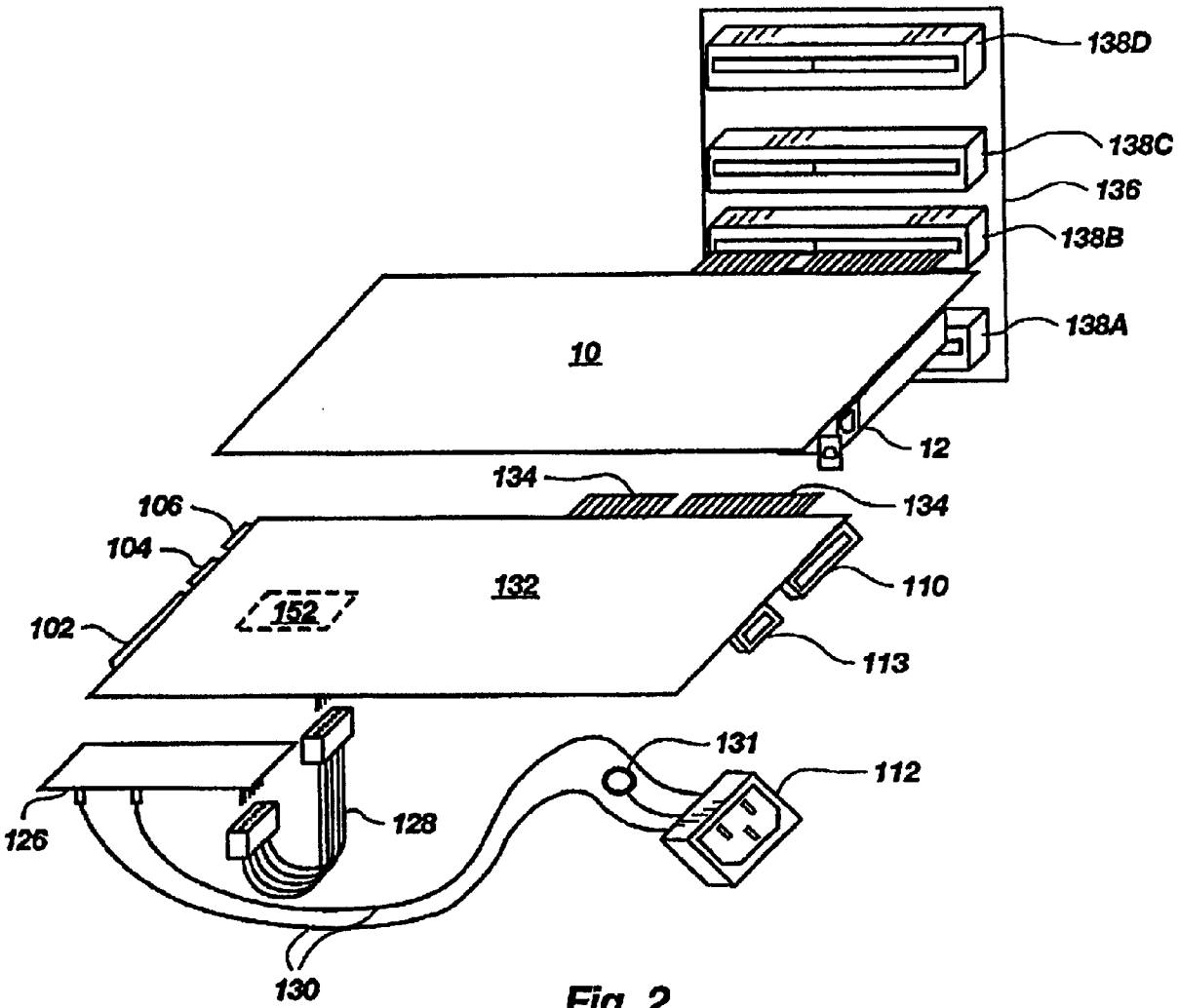
FIG. 2 is a perspective internal view of the first presently preferred embodiment represented in FIGS. 1A–B.

To minimize potential conflicts with ISA compliant add-on cards (such as video card 10 in FIG. 2), the interrupt register has been located within attribute memory space in this embodiment of the present invention. Having identified the initial requester, the translation program 140 passes the interrupt request to the ISA driver software associated with that particular ISA port or ISA compliant add-on card. Having serviced the request, the translation program 140 clears the bit within the interrupt register requesting the interrupt. The interrupt assignment of the port(s) is industry standard. The interrupt assignment of the add-on card(s) are generally made by placement of jumper connections on the ISA add-on card(s) and within the corresponding ISA driver software for the ISA add-on card(s) during installation of the ISA add-on card(s) in the manner prescribed by the manufacture of the ISA compliant add-on card or add-on product connected to the port(s). The correct ISA driver software having been called, the process is completed as is known in the art (see step 224).

In the described fashion, the present invention is able to provide a means for interrupt translation between the PCMCIA socket 150 and the ISA buss 154. As indicated earlier, means for interrupt translation may be omitted from some embodiments of the present invention. Moreover, the means for interrupt translation may be implemented differently than described herein and any alternative implementation which carries out the same or equivalent functions is intended to fall within the scope of the present invention.

Disadvantageously, PCMCIA socket 150 signals provide little or no direct memory access (DMA) support while the ISA buss 154 must provide multiple DMA hardware channels and hardware support signals (DRQ 0 through 7; DACK 0 through 7; AEN; TC). The DMA requirements in the ISA standard are particularly incompatible with signals presented at the PCMCIA socket 150. The present invention most preferably provides translation and interfacing of the signals so that complete ISA DMA support can be provided to ISA compliant devices (see FIG. 3A at block 162). It will be appreciated that the PCI standard does not require DMA support and that the embodiments of the present invention can provide complete compliance with PCI devices without including DMA support.

Signals which are particularly pertinent to providing ISA DMA support are listed below. DRQ signals are eight signals (0 through 7) which request a DMA transfer. DACK signals are eight signals (0 through 7) used by the host computer 122 to acknowledge the DMA request. The AEN signal line is the method by which ISA compliant add-on cards are informed that a DMA transfer cycle is occurring and that only the ISA compliant add-on card with an active DACK signal line can respond to the command signal lines. TC is the signal line which announces the terminal count and thus the end of the DMA transfer.

In accordance with the present invention, the eight DRQ (DMA request) signals from the ISA buss enter the translation circuit 152 (see step 228). Upon activation of one or more of these signals by the ISA compliant add-on card(s), the DRQ(s) is stored in a DMA register within the translation circuit 152 (see step 232). Each DRQ has a unique bit location within the DMA register. Having received and stored one or more DMA requests, the translation circuit 152 then sets a unique bit in its interrupt register, as indicated above (see steps 240 and 244). Having received an interrupt request, the translation circuit 152 then activates the IREQ signal to the PCMCIA socket 150. The IREQ signal then calls the translation program 140. Having been called, the translation program then reads the contents of the interrupt register within the translation circuit 152. Seeing that the unique bit associated with the DMA request has been set, the translation program 140 now processes the request as a DMA request, not an interrupt request. The translation program 140 communicates with the translation circuit 152 via the PCMCIA socket 150. In this way, from the perspective of the translation program 140 the DMA register may be located within a predefined location of attribute memory space, I/O space or memory space.

To minimize potential conflicts with ISA compliant add-on cards, the DMA register is preferably located within attribute memory space but can be located elsewhere in accordance with the present invention. Having identified the request as a DMA request, the translation program 140 then reads the contents of the translation circuit 152 DMA register to determine which of the ISA compliant add-on card(s) is/are making the request by noting if a particular ISA compliant add-on card's unique bit location is set. Having identified the unique DRQ number, the translation program 140 must now turn off all interrupts and other potential DRQs. The translation program 140 then sets a bit in the DACK register (see step 276) within the translation circuit 152 to signal which DRQ number is being serviced. This bit is mapped to the corresponding DACK signal lines. Also, the translation program disables the AEN bit within the translation circuit DMA Register in the translation circuit 152. The AEN bit is mapped to the AEN signal line and used by the ISA compliant add-on card(s) as previously described. The translation circuit 152 also uses this signal to ensure that I/O and memory command signals are both present during the DMA transfer.

The translation program now initiates the DMA transfer by using the DMA request register within a DMA controller (see step 292). Once the DMA controller concludes the transfers, control is returned to the translation program 140. The translation program 140 checks the DMA controller's status register to determine the status of TC. If TC is enabled, then the translation program 140 writes to the TC bit within the translation circuit DMA Register (see step 296). The TC bit within the DMA register is mapped to the TC signal driving the ISA compliant add-on card(s) (see step 284). The DACK signal is de-asserted and the AEN signal is asserted. The interrupts are again enabled. The translation program 140 now exits and the system flow returns to normal.

In some PC compatible computers, a DMA controller may not be present. If a DMA controller is not present on the host computer 122 of the PCMCIA socket 150, accommodation must be made. To ensure that a DMA controller is available if one is not present on the host computer 122, an IBM PC compatible DMA controller, for example an 8237A, is implemented within the translation circuit 152 (see FIG. 3A at block 172). For information on the requirements of such a DMA controller, see the publications ISA SYSTEM ARCHITECTURE and THE INDISPENSABLE PC HARDWARE Boos which were cited earlier. By convention, the various registers within the DMA controller reside at fixed addresses in I/O space. Advantageously, the translation circuit 152 implementation of the DMA controller resides at the same address as the host computer 122 DMA controller, if it is present in the host computer 122 If the DMA controller is present on the host computer 122, the host computer 122 will, by convention, block the PCMCIA socket 150 from seeing all I/O activity to the DMA controller addresses (see step 248). Thus, the DMA controller within the translation circuit 152 will be dormant and will not interact with other hardware or software. In cases where a DMA controller is present in the host computer 122 (see step 252), the steps discussed above in connection with when the DMA controller is present in the host computer 122 will preferably be followed (see steps 260, 264 & 268).

If the a DMA controller is not present on the host computer 122, the PCMCIA socket 150 will see all I/O activity to the DMA controller addresses. Thus, the DMA controller within the translation circuit 152 will essentially be automatically activated (see step 256). Advantageously, in the described manner no contention will exist between the two controllers. However, because the PCMCIA standards do not allow bus masters other than the host computer 122, and because a DMA controller requires itself to be a bus master, the translation program 140 must be called into play to emulate the DMA transfer in support of the DMA controller within the translation circuit 152 when the DMA controller within the translation circuit 152 is used (see step 272).

In order to decide how to handle ISA DMA procedures, the translation program 140 must determine the need to emulate DMA transfers in accordance with the ISA standard. In the embodiment of the present invention described herein, at boot time the translation program 140 will attempt "read, modify write, read" operations to one of the DMA controllers read only registers (see step 272). If a DMA controller is present in the host computer 122, the "modify write" operation will fail. However, the translation circuit's read only (by convention) registers are in fact read/write registers and thus the "modify write" operation will succeed if there is no DMA controller present on the host computer 122 (see step 276). Upon finding that the "modify write" operation succeeds, the translation program 140 will then configure itself to emulate the DMA transfer (see step 280).

When a DMA request is made by an ISA compliant add-on card via DRQx, the request is serviced as described above until the time the translation program 140 initiates the DMA transfer by using the DMA request register within the DMA controller. Instead of using the DMA request register, the ISA driver software reads the contents of the DMA controller's registers, including the full 24 bit address of the "current" address. The translation program 140 then performs a memory read or memory write operation, as dictated by the DMA controller mode register, to the address contained within the current address registers. The translation circuit 152 ensures that the I/O command signals to the ISA compliant add-on card(s) are also active during this transfer. The current address register is incremented or decremented as required by the DMA controller mode register. The current count register is decremented. The transfers continue as dictated by the type of transfer (demand, single, block) as determined by the information within the DMA controller mode register and potentially (in the case of demand transfers) the DRQ register.

In the described fashion, the present invention is able to provide a means for direct memory access translation between the PCMCIA socket 150 and the ISA buss 154. As indicated earlier, means for direct memory translation may be omitted from some embodiments of the present invention. Moreover, the means for direct memory access translation may be implemented differently than described herein and any alternative implementation which carries out the same or equivalent functions is intended to fall within the scope of the present invention.

Disadvantageously, the PCMCIA socket 150 signals do not provide for a bus address latch enable (BALE) signal which is part of the ISA standard. The present invention most preferably provides translation and interfacing of the PCMCIA standard signals so that the ISA BALE signal is provided to ISA compliant devices. To provide for a BALE signal, a 57 ns positive going pulse is generated on the negative edge of any I/O or memory command (read or write), but is not generated if attribute memory space is addressed (see FIG. 3A at block 164).

In the described fashion, the present invention is able to provide a means for translating a buss address latch enable signal between the PCMCIA socket 150 and the ISA buss 154. As indicated earlier, means for translating a buss address latch enable signal may be omitted from some embodiments of the present invention. Moreover, the means for translating a buss address latch enable signal may be implemented differently than described herein and any alternative implementation which carries out the same or equivalent functions is intended to fall within the scope of the present invention.

Disadvantageously, the PCMCIA socket 150 signals do not provide for SMEMR (System Memory Read) and SMEMW (System Memory Write) signals which are part of the ISA standard. The SMEMR and SMEMW command signals are active only when the address lines indicate the first one megabyte of address space and the corresponding memory read or memory write command signals are active. The ISA SMEMR and SMEMW signals are most preferably generated directly from MEMR and MEMW PCMCIA signals, respectively, if the lower first megabyte of memory is addressed (see FIG. 3A at block 166).

In the described fashion, the present invention is able to provide a means for translating between a memory read signal and a memory write signal of the PCMCIA socket 150 and a system memory read signal and a system memory write signal of ISA buss 154. As indicated earlier, means for translating between a memory read signal and a memory write signal and a system memory read signal and a system memory write signal may be omitted from some embodiments of the present invention. Moreover, the means for translating between a memory read signal and a memory write signal and a system memory read signal and a system memory write signal may be implemented differently than described herein and any alternative implementation which carries out the same or equivalent functions is intended to fall within the scope of the present invention.

Disadvantageously, the PCMCIA standard assumes that all memory is 16 bits and thus does not provide the MEMCS16 signal which is part of the ISA standard. The ISA MEMCS16 signal is inactive with an 8 bit ISA compliant add-on card.

The described embodiment of the present invention preferably provides an interface which is compatible with 8 bit ISA add-on cards, i.e. when MEMCS16 is inactive, by asserting the PCMCIA WAIT signal if the ISA buss cycle is a "read." The translation circuit 152 then fetches the word with two appropriate read bus cycles (using byte swapping logic within the translation circuit 152) to the ISA compliant add-on card and stores it temporarily as a 16 bit word in the translation circuit 152. The WAIT signal is then de-asserted and the word is read from the translation circuit 152.

In the described embodiment, to accommodate an 8 bit ISA compliant add-on card, i.e. when MEMCS16 is inactive, during a write operation, the word is written to temporary storage within the translation circuit 152. The WAIT signal is then asserted and the word is written to the ISA compliant add-on card using two write cycles (using byte swapping logic (see FIG. 3A at block 174) within the translation circuit 152)In In the described fashion, the present invention is able to provide a means for translation between the PCMCIA socket 150 and an 8 bit ISA compatible add-on memory card connected to the ISA buss 154. As indicated earlier, means for translating between the PCMCIA socket 150 and an 6 bit ISA compatible add-on card may be omitted from some embodiments of the present invention. Moreover, the means for translating between the PCMCIA socket 150 and an 8 bit ISA compatible add-on card may be implemented differently than described herein and any alternative implementation which carries out the same or equivalent functions is intended to fall within the scope of the present invention.

Disadvantageously, the PCMCIA standard does not provide for DRAM refresh as required by the ISA standard. The present invention most preferably provides DRAM refresh so that complete ISA DRAM support can be provided to ISA compliant devices.

To provide for DRAM refresh, the described embodiment of the present invention provides that every 15 microseconds the lower 8 address lines to the ISA compliant add-on card(s) are driven by the translation circuit 152 according to the address stored in the refresh register within the translation circuit 152 (see FIG. 3A at block 168). REFRESH is asserted A memory read cycle is then executed to the ISA compliant add-on card(s). The address stored is then incremented, REFRESH is deasserted, and the address lines to the ISA compliant card(s) are again driven by the PCMCIA socket.

In the described fashion, the present invention is able to provide a means for DRAM refresh on the ISA buss 154. As indicated earlier, means for DRAM refresh may be omitted from some embodiments of the present invention. Moreover, the means for DRAM refresh may be implemented differently than described herein and any alternative implementation which carries out the same or equivalent functions is intended to fall within the scope of the present invention.

Disadvantageously, PCMCIA socket 150 signals do not provide clock signals. The ISA standard requires a system bus clock (BCLK) signal operating a 8 MHz and an oscillator (OSC) signal operating at 14.31818 MHz, the color burst frequency for the NTSC television standard. The present invention, most preferably, provides a clock circuit 156 to generate a system bus clock (BCLK) signal operating at 8 MHz and an oscillator (OSC) signal line operating at 14.31818 MHz.

In the described fashion, the present invention is able to provide a means for providing a clock signal as required by the ISA buss 154. As indicated earlier, means for providing a clock signal may be omitted from some embodiments of the present invention. Moreover, the means for providing a clock signal may be implemented differently than described herein and any alternative implementation which carries out the same or equivalent functions is intended to fall within the scope of the present invention.

Disadvantageously, the PCMCIA socket 150 does not provide sufficient electrical current at +5 volts to meet the requirements of most ISA compliant add-on cards. Moreover, the PCMCIA standard does not ensure the availability of the −5 volts, +12 volts, and −12 volts required by the ISA standard. A power supply 158 provides the necessary ISA compliant voltages and current.

Thus, the present invention provides a means for supplying power to an ISA compliant device. As indicated earlier, means for supplying power to the ISA compliant devices may be omitted from some embodiments of the present invention. Moreover, the means for supplying power to an ISA compliant device may be implemented differently than described herein and any alternative implementation which carries out the same or equivalent functions is intended to fall within the scope of the present invention.

Disadvantageously, the PCMCIA standard timing requirements are much faster than an ISA compliant add-on card can support. Thus, the present invention includes means for translating the timing between the PCMCIA socket 150 and the ISA buss 154 (see FIG. 3A at block 172).

FIGS. 5A–L are detailed timing diagrams showing the signals which are generated in accordance with the PCMCIA standard, the ISA compliant device, and the buss translator structures of the present invention. In FIGS. 5A–D the bold italic type indicates a function carried out by the buss translator structures of the present invention while the plain type indicates a signal which is part of the PCMCIA or ISA standards. The bracketed designations indicate whether the indicated signal is generated by the portable host computer (122 in FIG. 1) in accordance with the PCMCIA standard [PCMCIA] or by the ISA compliant device or add-on card [Card] or by the translation structures described herein [Xlator]. A star indicates that a negative voltage is assertion of the signal. In FIGS. 5A–D, timing measurements are taken at the PCMCIA socket if the PCMCIA socket is involved; otherwise the timing measurement is taken at the translation circuit 152. In FIGS. 5E–L, the timing measurements are taken at the CPU.

The timing diagrams of FIGS. A–L show each of the bus cycles (read or write) for each of the access types (I/O or memory) for each of the standards (PCMCIA or ISA) and for the translation from PCMCIA to ISA. The standards timing is shown in plain face. The requirements of the translation circuit 152 within said translation circuit are shown in bold face. The arrows accompanying the bold face timing numbers originate at the signal translation which will be used to generate (after the delay timing indicted by the bold face) the signal transition pointed to by the arrow head. For example, in the timing diagram of FIG. 5B, the negative transition of IOWR* generates, after Ons minimum, the positive transition of BALE. The positive transition of BALE (in turn) generates, after 57 minimum, the negative transition of BALE. Timing delays are generated using clock signals, delay lines and circuit propagation delays preferably included in the translation circuit.

Particularly important is the generation of IOIS16* from IOCS16*. As shown in the timing diagrams of FIGS. 5A & 5B, the ISA compliant add-on card will generate IOCS16- too late for it to be used directly by the translation circuit 152 to generate IOIS16*. To provide the IOIS16* signal within ISA timing specifications, the translation circuit 152 must know before hand if the ISA compliant add-on card will assert IOCS16*. This is accomplished with the use of the translation program and a special memory, referred to herein as IOCS16* memory, located within the translation circuit 152 (see FIG. 3A at block 170). The IOCS16* memory contains the address locations for all 8 bit I/O add-on cards. Thus when such an ISA compliant add-on card is addressed, the translation circuit 152 need not wait to see if the add-on card will assert IOCS16*. The translation circuit 152 will, instead, look to the IOCS16* memory to determine if IOCS16* should be generated.

The writing of 8 bit I/O add-on card addresses into the IOCS16* memory is accomplished during boot time. During boot time the translation program 140 scans the I/O space with consecutive read cycles. The data read will be discarded, but if it is other than FFFFh and IOCS16* is not asserted, the address will be recorded within the IOCS16* memory. The translation circuit is earlier prepared for this scan period and its requirements for recording address location via the PCMCIA configuration registers is known in the art. In accordance with the present invention, the translation circuit 152 will have been prepared for this scan period and its requirements for recording address locations via the PCMCIA configuration registers.

In the described embodiment of the present invention, all I/O addresses will be assumed to be 16 bit unless recorded in IOCS16* memory. During run time it may become apparent, via IOCS16*, that a recording error has occurred with IOCS16* memory. This may arise because of a write only register or it may arise as a result of changing conditions. If IOCS16* signals disagree with IOCS16* memory too late (as defined by the PCMCIA specification), the cycle must proceed as indicated by IOCS16* memory, with recovery occurring as described below.

For a 16 bit read that should be an 8 bit read, WAIT* will be asserted until two read cycles stores the data in the translation circuit byte swapping circuits. The WAIT signal will be deasserted and the contents of the temporary memory within the translation circuit are then read to the host computer 122 via the PCMCIA socket 150.

For a 16 bit write that should be an 8 bit write, the data will be written into the translation circuit byte swapping circuits, then WAIT* will be asserted and finally the temporary data held within the translation circuit will be written, in two read cycles to the ISA compliant add-on card.

For an 8 bit read that should be a 16 bit read, the data will be handled correctly but slowly (i.e. two read cycles instead of one). For an 8 bit write that should be a 16 bit write, the data will be handled correctly but slowly (i.e. two write cycles instead of one). For each case in which there is an error in the IOCS16* memory, the error will be corrected during the cycle in which it is found.

An alternate implementation of the foregoing arrangement which is within the scope of the present invention is to scan for IOCS16* assertions and remember their addresses (no attention to data is required). To record either is sufficient since if the ISA compliant add-on card is not one it must be the other. Recording 8 bit I/O locations is more complicated, but results in less requirement for IOCS16* memory than recording 16 bit I/O locations.

Further pertinent information regarding the signal timing requirements is set forth in FIGS. 5A–L. Using the information set forth herein, those skilled in the art can arrive at numerous embodiments of the present invention. A brief description of each of the timing diagrams set forth in FIGS. 5A–L is provided below.

Figure 5A:
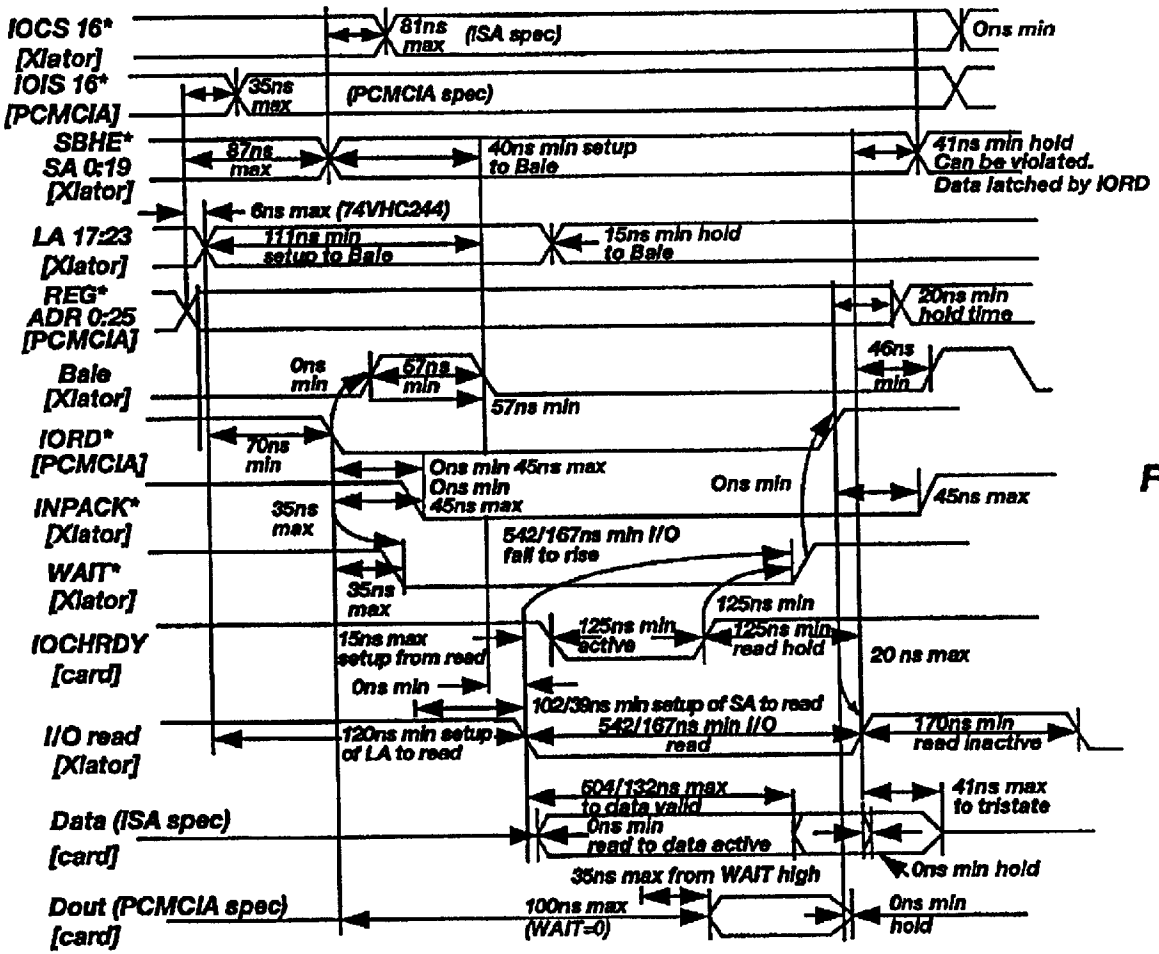
FIGS. 5A–L are timing diagrams showing the timing operations of the components represented in FIG. 3.

FIG. 5A indicates the preferred timing of a PCMCIA-ISA translation I/O read operation.

Figure 5B:
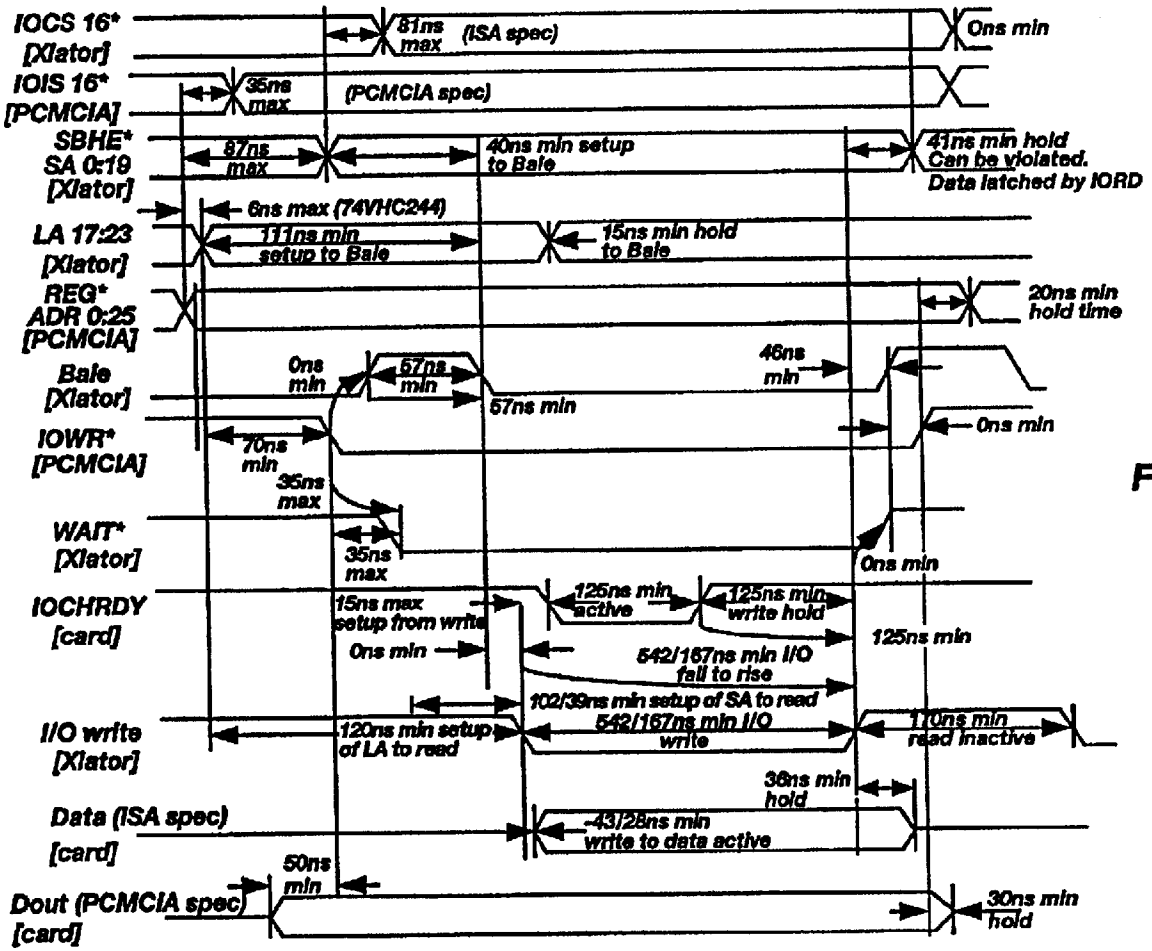

FIG. 5B indicates the preferred timing of a PCMCIA-ISA translation I/O write operation.

Figure 5C:
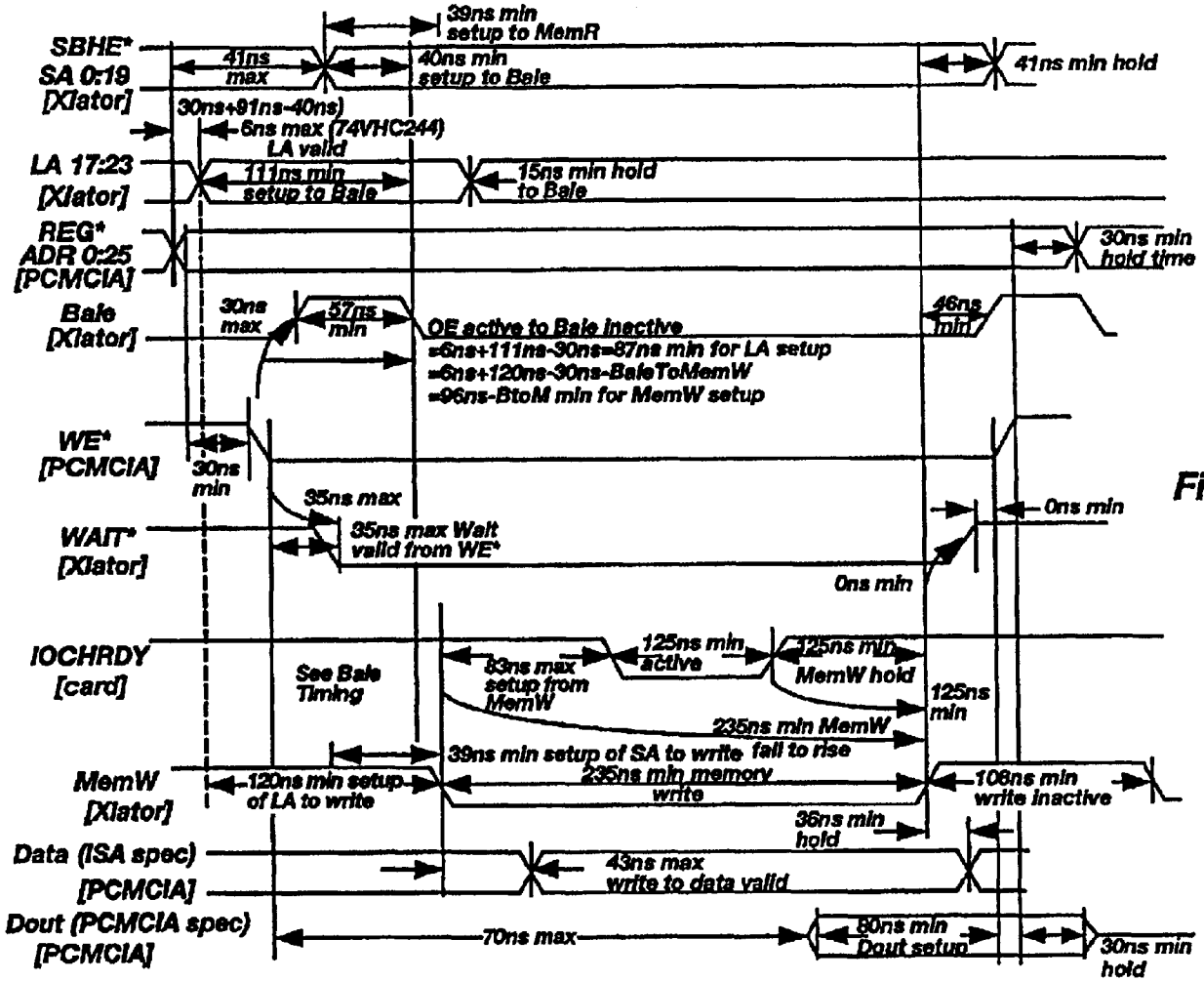

FIG. 5C indicates the preferred timing of a PCMCIA-ISA translation memory write operation.

Figure 5D:
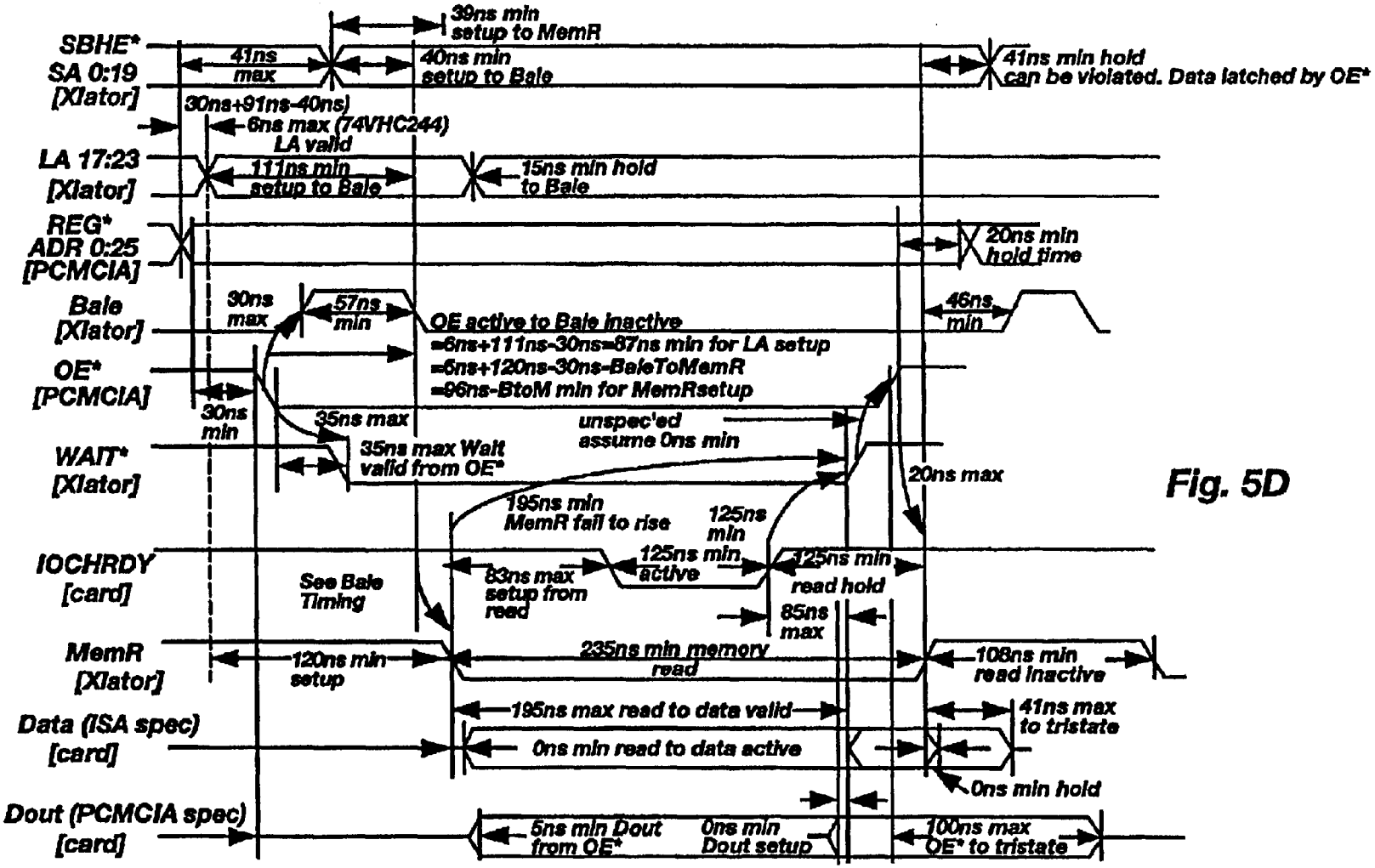

FIG. 5D indicates the preferred timing of a PCMCIA-ISA translation memory read operation.

Figure 5E:
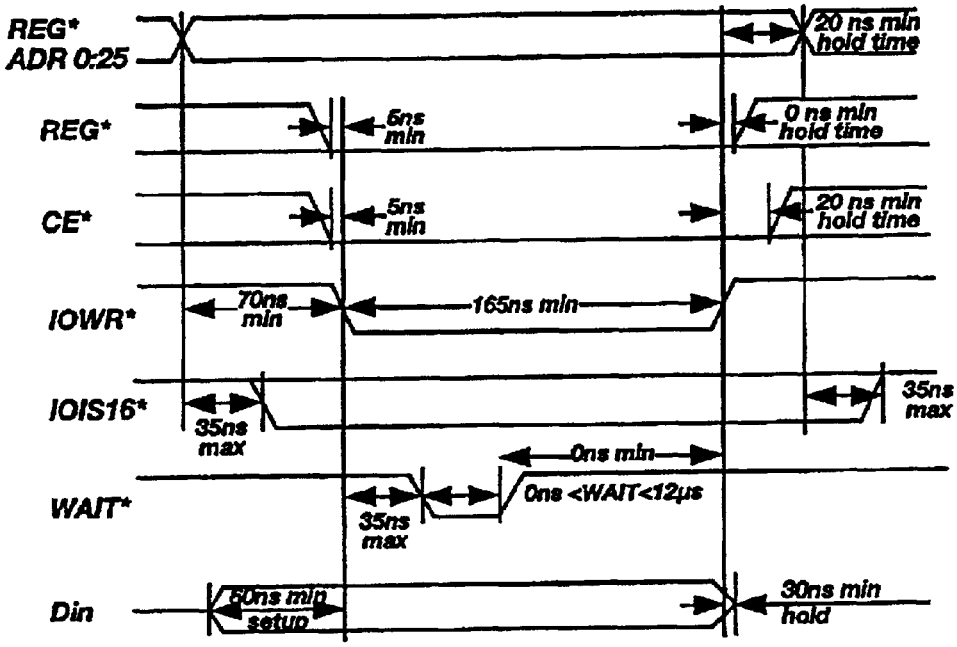

FIG. 5E shows the timing of a PCMCIA I/O write operation.

Figure 5F:
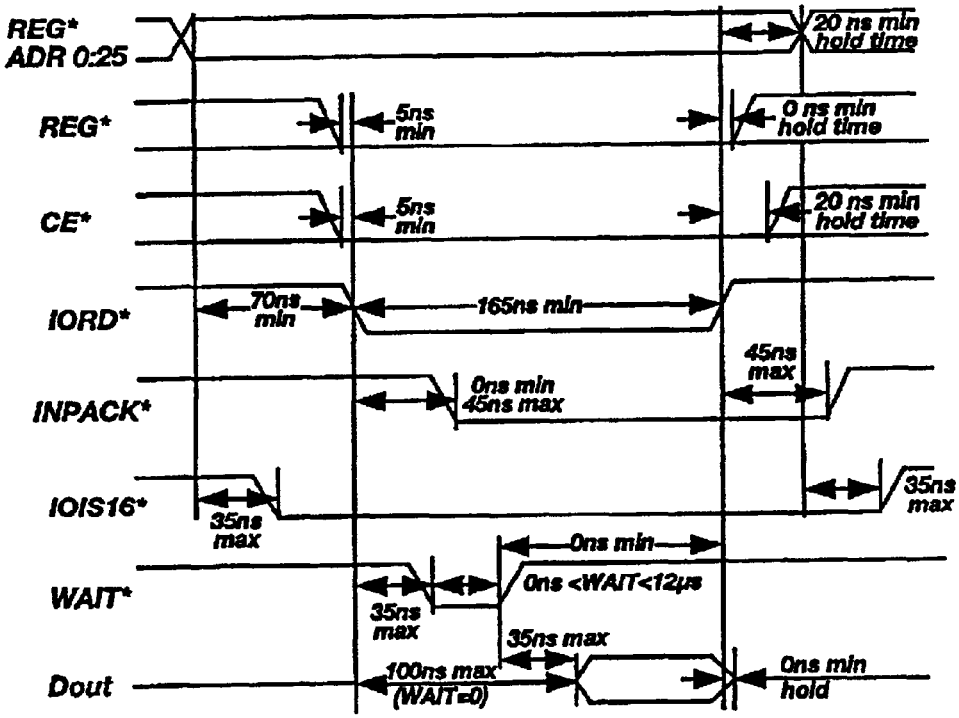

FIG. 5F shows the timing of a PCMCIA I/O read operation.

Figure 5G:
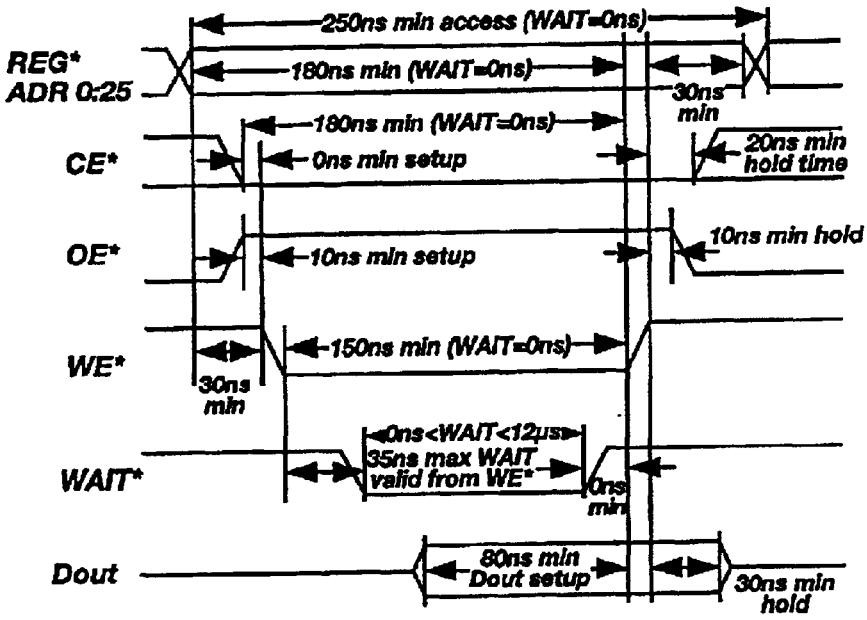

FIG. 5G shows the timing of a PCMCIA memory write operation.

Figure 5H:
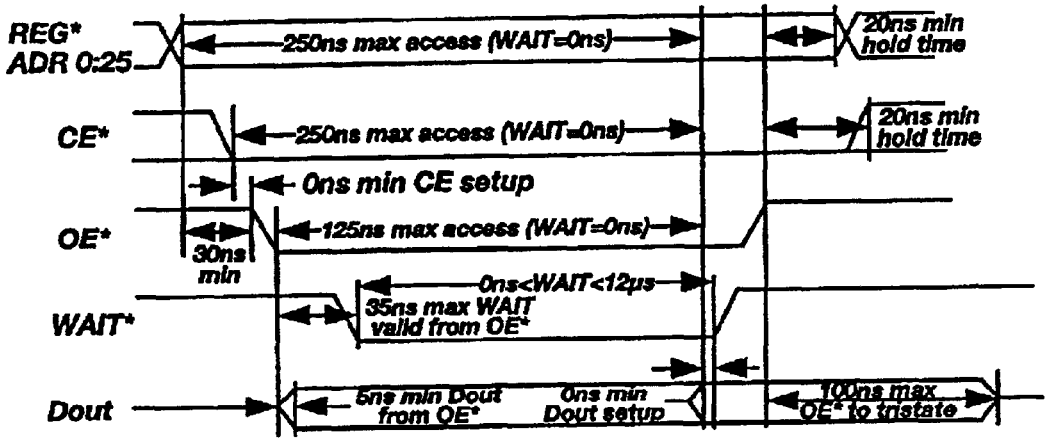

FIG. 5H shows the timing of a PCMCIA memory read operation.

Figure 5I:
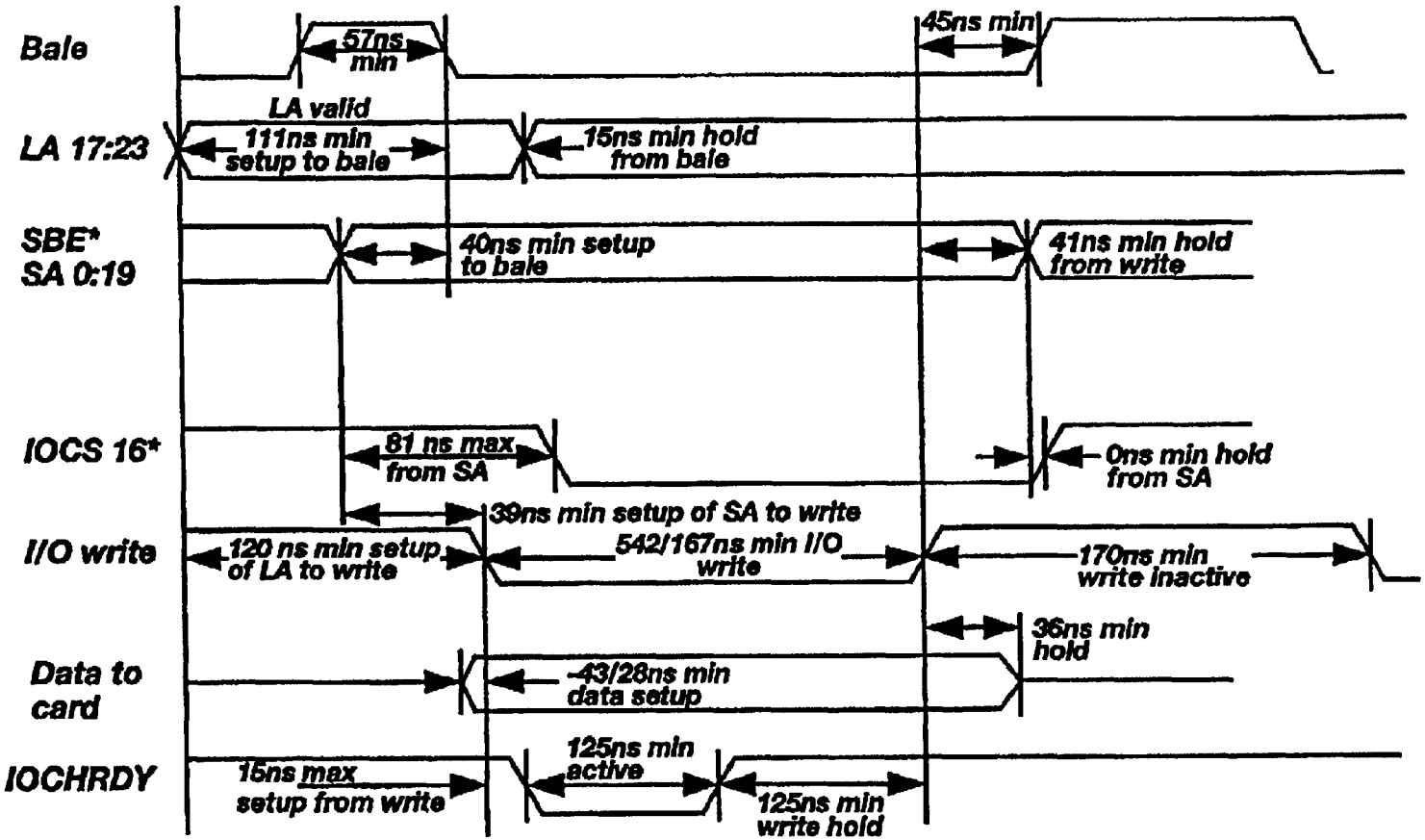

FIG. 5I shows the timing of an ISA I/O write operation.

Figure 5J:
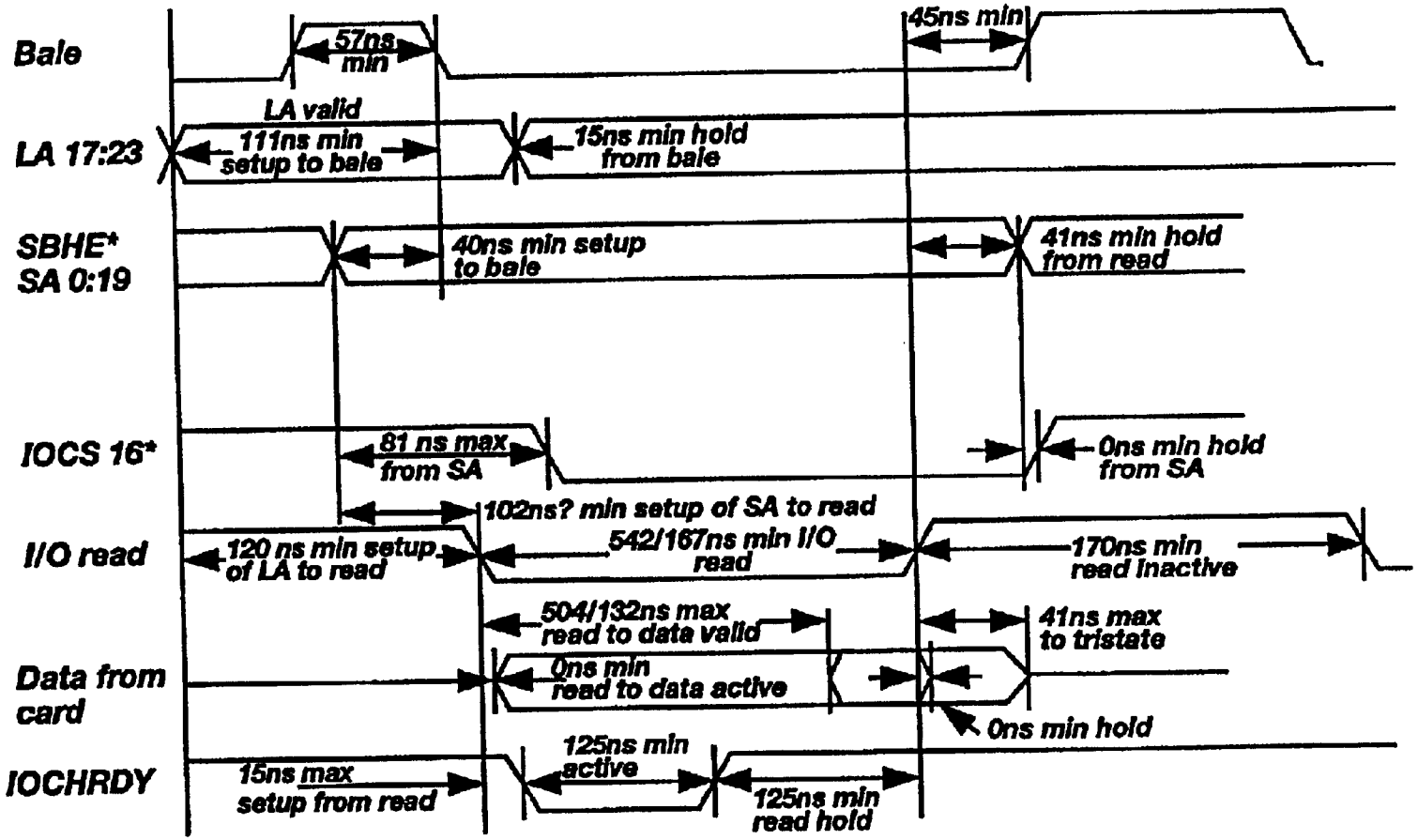

FIG. 5J shows the timing of an ISA I/O read operation.

Figure 5K:
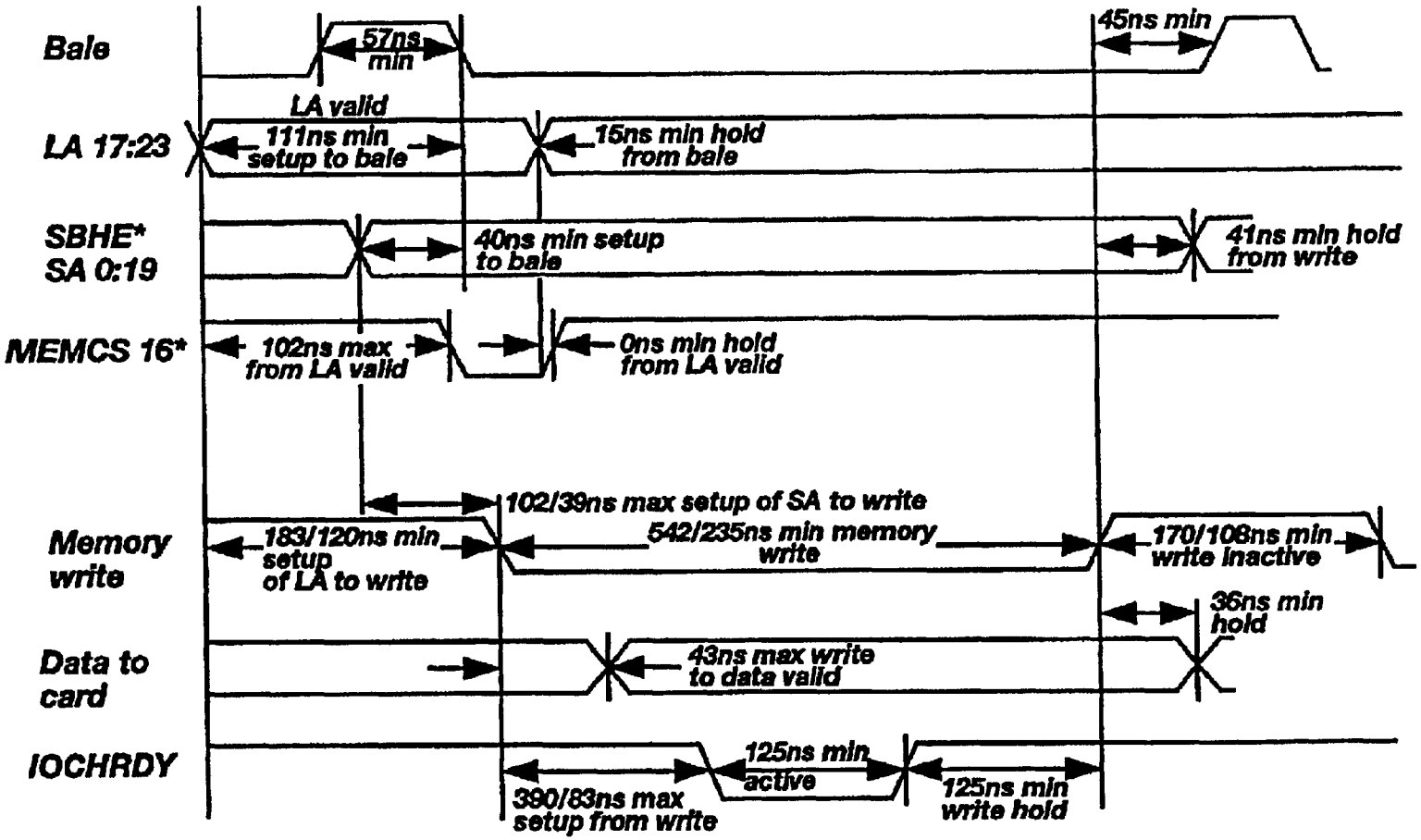

FIG. 5K shows the timing of an ISA memory write operation.

Figure 5L:
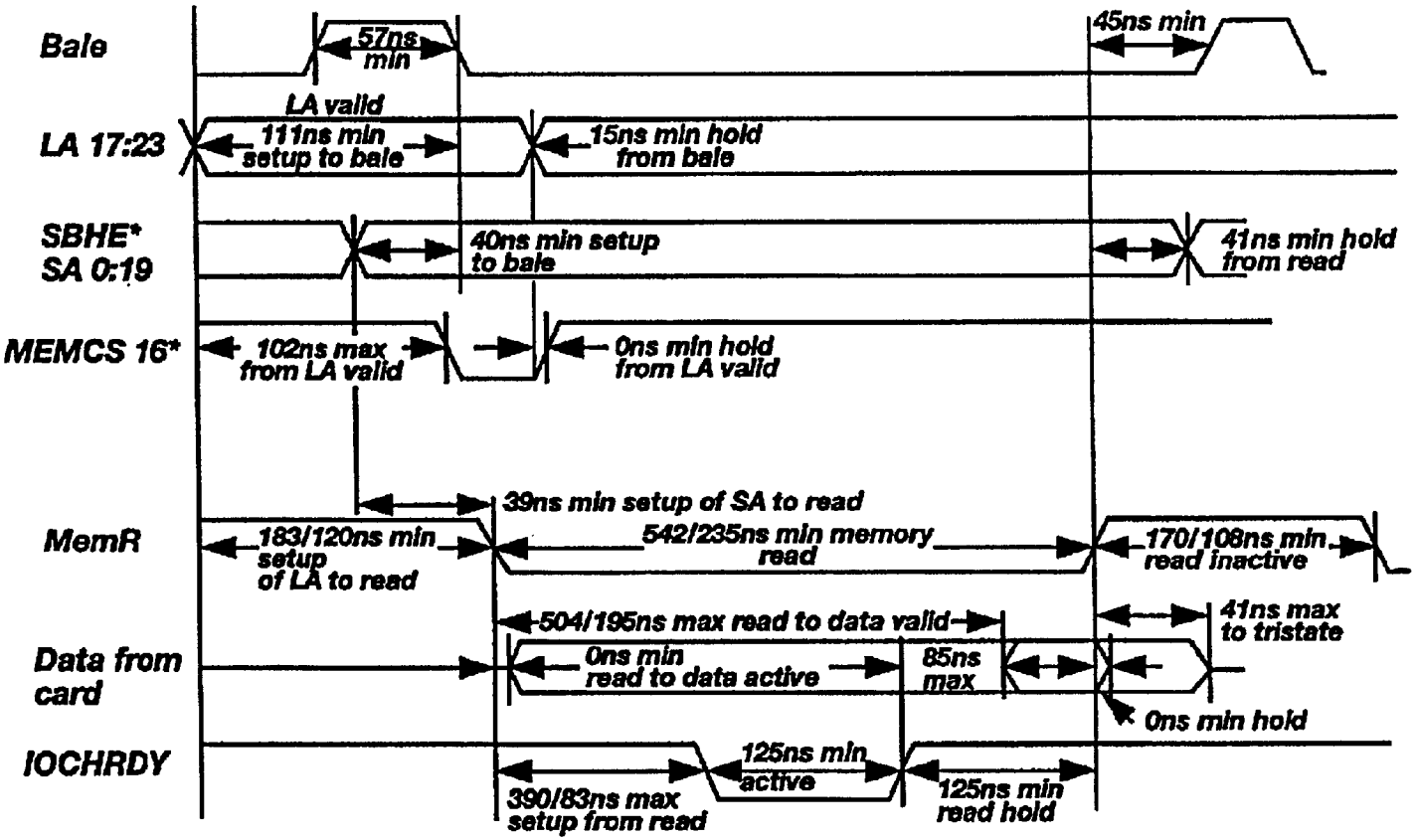

FIG. 5L shows the timing of an ISA I/O memory read operation.

From the foregoing, it will be appreciated that the present invention provides a system and method for conveniently expanding a computer using widely available peripheral devices even though such devices are not intended to be used with the computer. The present invention also provides a system and method for expanding the capabilities of a portable computer, and particularly a lap top or smaller computer, using devices intended to be installed in a desk top computer and in particular the present invention conveniently and reliably interfaces ISA and/or PCI compliant expansion add-on printed circuit cards with a PCMCIA compliant socket.

The present invention also allows expansion of the number of ports found on a lap top or smaller computer via the PCMCIA socket found on the computer and provides for interfacing of a device which requires any one of a number of different interrupt requests with a computing device which provides only one interrupt request. The present invention also provides an interface for a device which requires direct memory access with a computing device which does not provide direct memory access and also accurately translates the timing of ISA and or PCI compliant signals to PCMCIA compliant signals and accurately translates PCMCIA compliant signals to ISA and/or PCI compliant signals in a manner which is transparent to the devices involved and to the user of the computer. Moreover, the present invention also interfaces 8 bit peripheral memory devices with a computing device which only accommodates 16 bit memory signals and also supplies the voltage and current requirements of an ISA and/or PCI compliant add-on expansion printed circuit card which cannot be supplied by a host computer.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed is:

1. A system for providing translation between a host computer having a first port, the first port compliant with a first standard, the first standard being selected from the group consisting of PCMCIA and Card Bus, and a hardware device which is compliant with a second standard, the second standard being selected from the group consisting of ISA and PCI, the first standard and the second standard being non-compatible with each other, the system comprising:

means for direct memory access translation between the host computer and the hardware device;

means for supplying power to the hardware device; and means for translating the timing between the host computer and the hardware device such that the host computer and the hardware device are interfaced and the function of the hardware device are provided to the host computer.

2. A system as defined in claim 1 wherein the first standard is the PCMCIA standard and wherein the second standard is the ISA standard.

3. A system as defined in claim 1 wherein the first standard is the PCMCIA standard and wherein the second standard is the PCI standard.

4. A system as defined in claim 1 further comprising means for interrupt translation between the host computer and the hardware device.

5. A system as defined in claim 1 wherein the hardware device comprises at least one ISA compliant add-on printed circuit card.

6. A system as defined in claim 1 wherein the hardware device comprises at least one PCI compliant add-on printed circuit card.

7. A system as defined in claim 1 wherein means for direct memory access translation comprises:

a DMA register; and a DMA controller.

8. A system as defined in claim 1 wherein the means for supplying power to the hardware device comprises:

means for supplying +12 volts;

means for supplying −12 volts;

means for supplying +5 volts; and means for supplying −5 volts;

all at a current required to operate the hardware device.

9. A system as defined in claim 1 wherein the port comprises a PCMCIA socket.

10. A system as defined in claim 1 wherein the means for translating the timing comprises a read/write timing generator.

11. A system for providing translation between a host computer having a first port, the first port compliant with a first standard, the first standard being selected from the group consisting of PCMCIA and CardBus, and a hardware device which is compliant with a second standard, the second standard being selected from the group consisting of ISA and PCI, the first standard and the second standard being non-compatible with each other and the hardware device requiring support for a plurality of interrupts, the system comprising:

means for interrupt translation between the host computer and the hardware device and for providing interrupt support for a plurality of interrupt request levels;

means for supplying power to the hardware device; and means for translating the timing between the host computer and the hardware device such that the host computer and the hardware device are interfaced and the functions of the hardware device are provided to the host computer.

12. A system as defined in claim 11 wherein the first standard is the PCMCIA standard and wherein the second standard is the ISA standard.

13. A system as defined in claim 11 wherein the first standard is the PCMCIA standard and wherein the second standard is the PCI standard.

14. A system as defined in claim 11 wherein the means for interrupt translation comprises means for translating multiple interrupts required by the hardware device to a single interrupt.

15. A system as defined in claim 14 wherein the multiple interrupts comprises at least five interrupts.

16. A system as defined in claim 11 wherein the hardware device comprises at least one ISA compliant add-on circuit card.

17. A system as defined in claim 11 wherein the hardware device comprises at least one PCI compliant add-on circuit card.

18. A system as defined in claim 11 further comprising means for direct memory access translation.

19. A system as defined in claim 11 wherein the means for supplying power to the hardware device comprises:

means for supplying +12 volts;

means for supplying −12 volts;

means for supplying +5 volts; and means for supplying −5 volts;

all at a current required to operate the hardware device.

20. A system as defined in claim 11 wherein the port comprises a PCMCIA socket.

21. A system as defined in claim 11 wherein the means for translating the timing comprises a read/write timing generator.

22. A system for expanding a host computer having a PCMCIA compliant port and allowing the host computer to interface with at least one ISA compliant device, the system comprising:

means for making electrical and physical connection to the PCMCIA compliant port;

means for making electrical connection to the at least one ISA compliant device;

means for interrupt translation between the PCMCIA port and the at least one ISA compliant device;

means for direct memory access translation between the PCMCIA port and the at least one ISA compliant device;

means for providing a clock signal to the ISA compliant device;

means for supplying power to the at least one ISA compliant device; and means for translating the timing between the PCMCIA port and the ISA compliant device such that the host computer can utilize the functions of the at least one ISA compliant device.

23. A system as defined in claim 22 wherein the at least one ISA compliant device comprises an ISA compliant add-on card and wherein the system further comprises a serial port, a parallel port, a key board port, and a mouse port.

24. A system as defined in claim 22 further comprising means for providing DRAM refresh to the ISA compliant device.

25. A system as defined in claim 22 wherein the means for supplying power comprises:

means for supplying +12 volts;

means for supplying −12 volts;

means for supplying +5 volts; and means for supplying −5 volts;

all at a current required to operate the hardware device.

26. A system as defined in claim 22 wherein the means for providing a clock signal comprises means for providing an 8 MHz clock signal and means for providing a 14.318 MHz clock signal.

27. A system as defined in claim 22 further comprising:

means for translating a buss address latch enable signal between the PCMCIA port and the at least one ISA compliant device;

means for translating between a memory read signal and a memory write signal of the PCMCIA port and a system memory read signal and a system memory write signal for the at least one ISA compliant device; and means for translation between the PCMCIA port and an 8 bit ISA compatible add-on card.

28. A method for providing translation between a host computer having a first port, the first port compliant with a first standard, the first standard being selected from the group consisting of PCMCIA and CardBus, and a hardware device which is compliant with a second standard, the second standard being selected from the group consisting of ISA and PCI, the first standard and the second standard being non-compatible with each other and the hardware device requiring support for a plurality of interrupts, the method comprising the steps of:

direct memory access translation between the host computer and the hardware device;

translating between the interrupts of the host computer and the plurality of interrupts of the hardware device;

supplying power to the hardware device; and translating the timing between the host computer and the hardware device such that the host computer and the hardware device are interfaced and the functions of the hardware device are provided to the host computer.

29. A method for providing translation between a host computer having a first port, the first port compliant with a first standard, the first standard being selected from the group consisting of PCMCIA and CardBus, and a hardware device which is compliant with a second standard, the second standard being selected from the group consisting of ISA and PCI, the first standard and the second standard being non-compatible with each other, the method comprising the steps of:

direct memory access translation between the host computer and the hardware device;

supplying power to the hardware device; and translating the timing between the host computer and the hardware device such that the host computer and the hardware device are interfaced and the function of the hardware device are provided to the host computer.

30. A method for expanding a host computer having a PCMCIA compliant port and allowing the host computer to interface with at least one ISA compliant device, the method comprising the steps of:

making electrical and physical connection to the PCMCIA compliant port;

making electrical connection to the at least one ISA compliant device;

translation between the PCMCIA port interrupt and the interrupts of the at least one ISA compliant device;

direct memory access translation between the PCMCIA port and the at least one ISA compliant device;

providing a clock signal to the ISA compliant device;

supplying power to the at least one ISA compliant device; and translating the timing between the PCMCIA port and the ISA compliant device such that the host computer can utilize the functions of the at least one ISA compliant device.

*31. A computer system, comprising:*

*a) a portable computer having a motherboard expansion interface, said portable computer capable of generating output signals for designated peripheral devices;*

*b) a physically remote control unit interfacing with said portable computer motherboard expansion interface;*

*c) a plurality of peripheral devices coupled to said control unit, with at least one of said peripheral devices being a user input device capable of generating input signals, and*

*d) said control unit comprising a circuit;*

*i) converting said output signals from said portable computer motherboard expansion interface into a form compatible with said designated peripheral device;*

*ii) routing said converted signal to said designated peripheral device;*

*iii) converting said input signal from the designated peripheral device into a form compatible with said portable computer motherboard expansion interface; and*

*iv) prioritizing access to said motherboard expansion interface by said input signals.*

*32. The computer system of claim 31 wherein said motherboard expansion interface comprises a PCMCIA interface.*

*33. A docking station for interfacing a plurality of peripherals to a physically remote portable computer having a motherboard expansion interface, wherein the remote portable computer generates output signals for designated peripherals, and the peripheral devices generate input signals for the portable computer, the docking station comprising:*

*a) a docking station interface configured to communicate input and output signals with the motherboard expansion interface of the portable computer;*

*b) a circuit converting output signals generated by the portable computer motherboard expansion interface into a form compatible with the designated peripherals;*

*c) a circuit routing said converted signals to said designated peripherals;*

*d) a circuit converting input signals generated by the peripheral devices into a form compatible with the portable computer motherboard expansion interface; and*

*e) a circuit prioritizing access by the input signals to said motherboard expansion interface.*

*34. The docking station of claim 33 wherein at least one of the peripheral devices is a user input device.*

*35. The docking station of claim 33 wherein said motherboard expansion interface comprises a PCMCIA interface.*

*36. A docking station having a controller adapted to an interface a plurality of physically remote peripheral devices with a portable computer motherboard expansion interface, said controller converting output signals from the portable computer motherboard expansion interface into a form compatible with the remote peripheral devices, and converting input signals from the remote peripheral devices into a form compatible with the portable computer motherboard expansion interface, wherein the controller further prioritizes access of the peripheral devices to said motherboard expansion interface.*

*37. The docking station of claim 36 wherein said motherboard expansion interface comprises a PCMCIA interface.*

*38. A method for interfacing a remote peripheral device generating an input signal to a portable computer generating output signals via a motherboard expansion interface, the method comprising the steps of:*

*a) driving data to be written to the peripheral device on the motherboard expansion interface;*

*b) converting said output signals from said portable computer motherboard expansion interface into a form compatible with said designated peripheral device;*

*c) routing said converted signal to said designated peripheral device; and*

*d) converting said input signal from the designated peripheral device into a form compatible with said portable computer motherboard expansion interface, further comprising the step of prioritizing access to said portable computer motherboard expansion interface by said input signals.*

*39. The method as specified in claim 38 wherein said motherboard expansion interface comprises a PCMCIA interface.*

*40. The method of claim 38 wherein the interfacing is accomplished by activating a write signal a period before a standard write signal.*

*41. A computer system, comprising:*

*a) a portable computer having a motherboard and a motherboard expansion interface, the portable computer motherboard capable of generating output signals;*

*b) a control unit receiving the motherboard output signals;*

*c) at least one peripheral device coupled to the portable computer motherboard via the motherboard expansion interface and the control unit; and*

*d) the control unit comprising a circuit;*

*i) converting the output signals from the portable computer motherboard into a form compatible with the peripheral device;*

*ii) routing the converted signals to the peripheral device;*

*iii) converting the input signal from the peripheral device into a form compatible with the portable computer motherboard; and*

*iv) prioritizing access to the motherboard by the input signals.*

* * * * *